(12) United States Patent
Suzuki et al.

(10) Patent No.: US 6,880,498 B2
(45) Date of Patent: Apr. 19, 2005

(54) INTERNAL COMBUSTION ENGINE INCLUDING HEAT ACCUMULATION SYSTEM, AND HEAT CARRIER SUPPLY CONTROL SYSTEM

(75) Inventors: Makoto Suzuki, Mishima (JP); Katuhiko Arisawa, Susono (JP); Masakazu Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/330,223

(22) Filed: Dec. 30, 2002

(65) Prior Publication Data

US 2003/0131806 A1 Jul. 17, 2003

Related U.S. Application Data

(62) Division of application No. 09/883,352, filed on Jun. 19, 2001, now Pat. No. 6,564,757.

(30) Foreign Application Priority Data

| Jun. 22, 2000 | (JP) | ................................. 2000-188274 |
| Jul. 10, 2000 | (JP) | ................................. 2000-209123 |
| Jul. 10, 2000 | (JP) | ................................. 2000-209125 |

(51) Int. Cl.$^7$ ............................................. F01P 11/02
(52) U.S. Cl. .............................. 123/41.14; 123/142.5 R
(58) Field of Search .......................... 123/41.14, 142.5 R

(56) References Cited

U.S. PATENT DOCUMENTS

| 4,556,171 | A | | 12/1985 | Fukami et al. |
| 4,641,613 | A | * | 2/1987 | Delesalle ................ 123/179.21 |
| 5,048,752 | A | | 9/1991 | Hintennach et al. |
| 5,730,089 | A | * | 3/1998 | Morikawa et al. ....... 123/41.14 |
| 5,765,511 | A | | 6/1998 | Schatz |
| 6,082,626 | A | | 7/2000 | Morikawa et al. |

FOREIGN PATENT DOCUMENTS

| DE | 3212043 A | * 10/1983 | ............ F01P/11/20 |
| DE | 42 14 850 A | 11/1993 | |
| DE | 4214850 A | * 11/1993 | ............ F01P/11/20 |
| DE | 198 47 607 A | 4/2000 | |
| JP | A 5-256133 | 10/1993 | |
| JP | A 6-185359 | 7/1994 | |
| JP | 9-272327 A | 10/1997 | |
| JP | A 10-71838 | 3/1998 | |
| JP | A 10-309933 | 11/1998 | |

OTHER PUBLICATIONS

Patent Abstracts of Japan, vol. 1998, No. 02, Jan. 1998, for JP–A 9–272327 Abstract Oct. 1997 (foreign application JP–A 9–272327 disclosed Dec. 30, 2002).

\* cited by examiner

*Primary Examiner*—Noah P. Kamen
(74) *Attorney, Agent, or Firm*—Oliff & Berridge, PLC

(57) ABSTRACT

Disclosed is a technology capable of efficiently supplying a heater core 12 or a heat accumulation system 15 or an internal combustion engine body 1 with cooling water heated by a cooling water heating mechanism 20 by restraining an unnecessary heat radiation from the cooling water in an internal combustion engine including the heat accumulation system. The internal combustion engine including the heat accumulation system has a first heat carrier circulation route on which the heat carrier circulates through the cooling water heating mechanism 20 and the heater core 12 without via the internal combustion engine body 1, a second heat carrier circulation route on which the heat carrier circulates through the cooling water heating mechanism 20 and the heat accumulation system 15 without via the internal combustion engine body 1, and a heat carrier circulation route on which the heat carrier circulates through the heat accumulation system 15 and the internal combustion engine body 1, and is capable of properly selecting these routes.

10 Claims, 24 Drawing Sheets

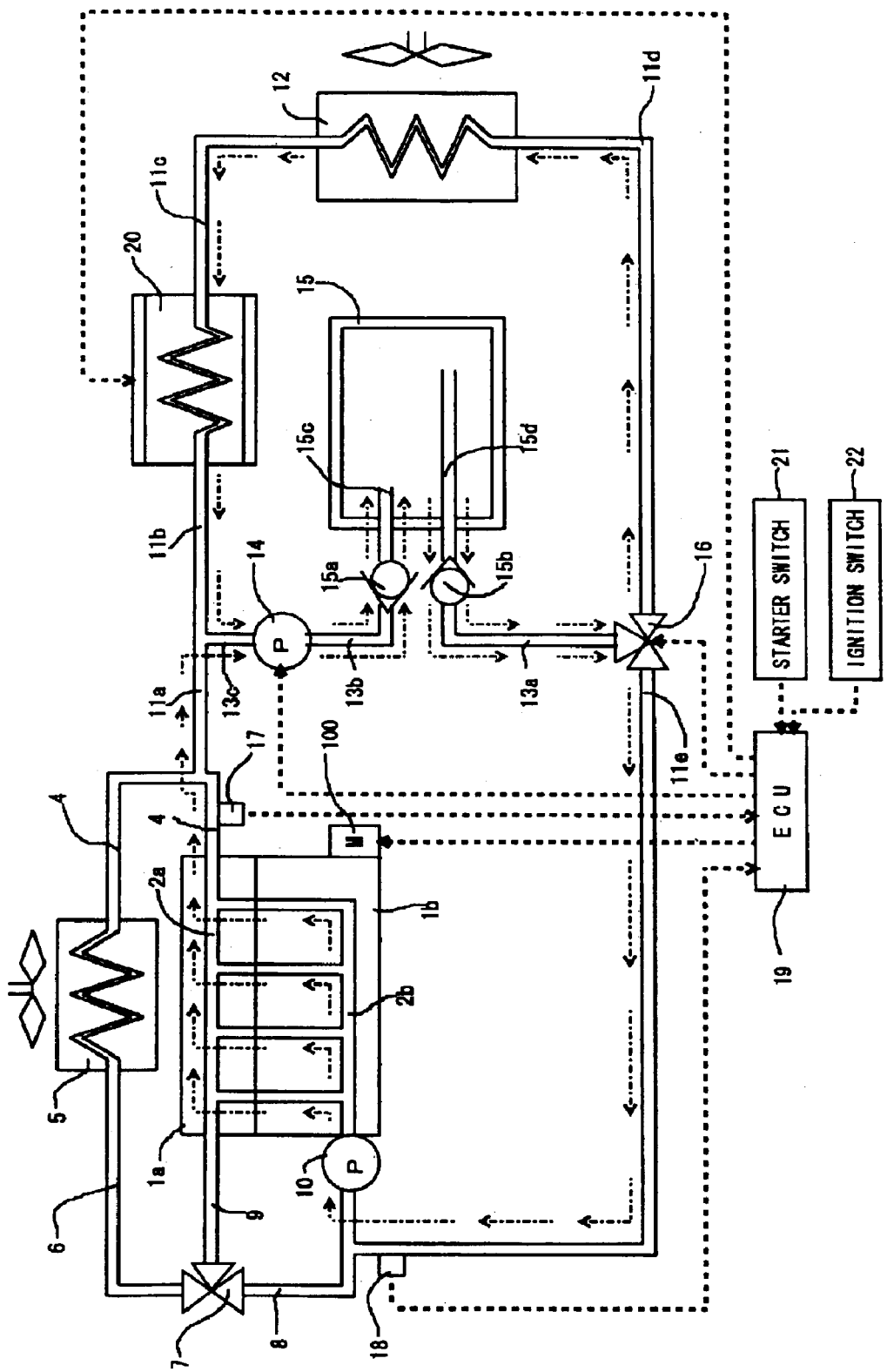
F I G. 22

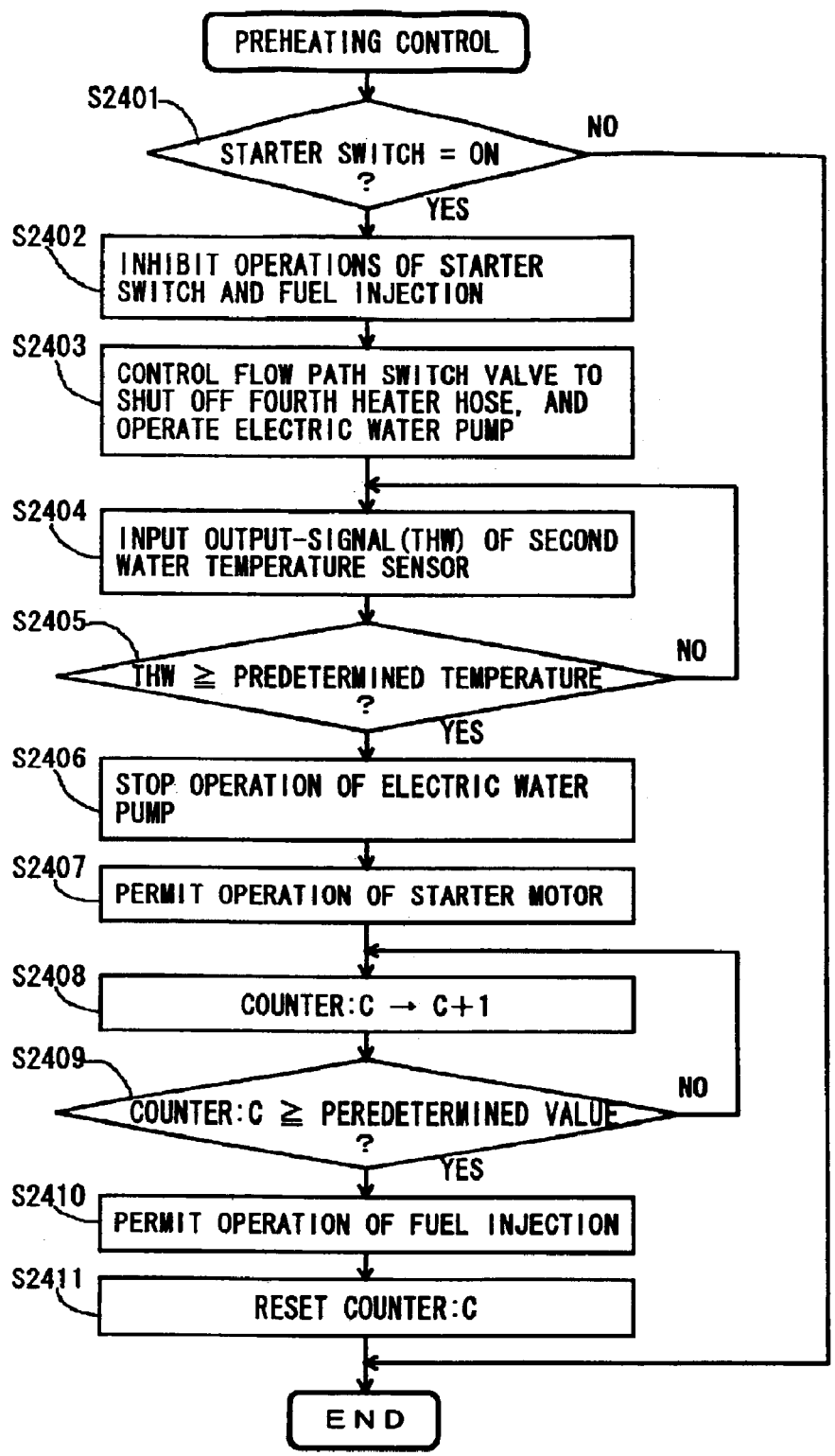
F I G. 24

INTERNAL COMBUSTION ENGINE INCLUDING HEAT ACCUMULATION SYSTEM, AND HEAT CARRIER SUPPLY CONTROL SYSTEM

BACKGROUND OF THE INVENTION

The present invention relates generally to an internal combustion engine cooled or heated by circulating a heat carrier such as cooling water etc, and more particularly to an internal combustion engine including a heat accumulation system for accumulating the heat held by the heat carrier.

In the case of executing a cold start-up of the internal combustion engine, a temperature of a wall surface of each of an intake port and a combustion chamber is low, and therefore a temperature of suction air is easy to decrease corresponding thereto. When the temperature of the suction air of the internal combustion engine is low, a fuel is hard to vaporize and is easy to adhere to the wall surface of the combustion chamber etc, and hence there is a necessity of increasing a quantity of fuel injection in a way that takes a wall surface adhered fuel quantity into account.

When the temperature of the suction air of the internal combustion engine is low, a temperature of an air/fuel mixture at a compression stroke is lowered, so that an ignitability of the fuel is easy to decline and a comparatively large quantity of fuel is easily discharged from the internal combustion engine as the fuel remains unburned.

Further, if the internal combustion engine is classified as a water cooled internal combustion engine, a temperature of the cooling water is lowered when performing the cold start-up of the internal combustion engine. It is therefore impossible to exchange the heat between the cooling water and the air for heating an interior of a car room and is difficult for an car room interior heating system to exhibit a sufficient performance.

Thus, when the internal combustion engine is in the cold state, there arise a variety of problems such as a decline of start-up property, an increase in quantity of fuel consumption, deterioration of an emission of exhaust gas or a decline of performance of the car room interior heating system.

To overcome the variety of problems given above, there have hitherto been proposed a heat accumulation system of an engine as disclosed in Japanese Patent Application Laying-open Publication No. 6-185359 and a heating system for a vehicle as disclosed in Japanese Patent Application Laying-Open Publication No. 10-309933.

The heat accumulation system of the engine disclosed in Japanese Patent Application Laying-Open Publication No. 6-185359, has a heat accumulator provided in a second cooling water passageway in a water cooled internal combustion engine including a first cooling water passageway extending via a cylinder block and the second cooling water passageway extending via a cylinder head.

This heat accumulation system of the engine is constructed to warm up preferentially the cylinder head by circulating the cooling water heated by the heat accumulator through the second cooling water passageway, thereby attempting to warm up an intake system and a fuel supply system.

On the other hand, the heating system for the vehicle disclosed in Japanese Patent Application Laying-open Publication No. 10-309933, includes a water passageway for flowing the cooling water via the internal combustion engine and a heater core, a heat accumulation tank, provided more upstream in a cooling water flowing direction than the heater core, for reserving the cooping water in a way that keeps the heat, an exothermic body, provided more upstream in the cooling water flowing direction than the heat accumulation tank on the water passageway, for heating the cooling water flowing through the water passageway, and an electrically-driven pump, disposed more upstream in the cooling water flowing direction than the exothermic body on the water passageway, for feeding by pressure the cooling water flowing through the water passageway.

This heating system for the vehicle is constructed such that the high-temperature cooling water heated by the exothermic body is reserved in a heat accumulation tank and supplied to the heater core when the temperature of the cooling water is low as at a cold time, thereby enhancing a heating performance.

By the way, in the heat accumulation system of the engine disclosed in Japanese Patent Application Laying-Open Publication No. 6-185359, even after the high-temperature cooling water within the heat accumulator (which will hereinafter be called heat accumulation hot water) has reached the cylinder head, the cooling water continues to circulate, and hence the following problems (1)~(3) might arise.

(1) The heat accumulation hot water having arrived at the cylinder head from the heat accumulator is discharged from the cylinder head, and the low-temperature cooling water staying previously in the cylinder head again flows into the cylinder head. Therefore, the cylinder head heated by the heat accumulation hot water is cooled by the low-temperature cooling water.

(2) When the heat accumulation hot water flows somewhere other than the cylinder head, the heat of the heat accumulation hot water is transferred to a member excluding the cylinder head.

(3) If the heat accumulation hot water is circulated by an electrically-driven water pump, the electric power consumed by the electrically-driven water pump unnecessarily increases.

Further, in the heating system for the vehicle disclosed in Japanese Patent Application Laying-Open Publication No. 10-309933, the internal combustion engine, the electrically-driven pump, the electric heater, the heat accumulation tank and the heater core are disposed in series sequentially from an upstream side of the cooling water flowing direction. Therefore, the following problems (a)~(c) might be caused.

(a) If there arises a necessity of supplying the heater core with the cooling water heated by the electric heater, a large quantity of cooling water in the circulation circuit extending via all of the internal combustion engine, the electrically-driven pump, the electric heater, the heat accumulation tank and the heater core, must be heated, resulting in an increase in consumption of the electric power and a decline of the heating performance. Especially because of a large thermal capacity of the internal combustion engine, the heat of the cooling water heated is absorbed by the internal combustion engine.

(b) In the case of supplying the internal combustion engine with the heat accumulation hot water in the heat accumulation tank, the cooling water having flowed out of the heat accumulation tank flows into the internal combustion engine after via the heater core, so that a flow resistance of the cooling water rises. In this case, a quantity of the heat accumulation hot water flowing into the internal combustion engine per unit time decreases, and a quantity of the heat transferred to the internal combustion engine from the heat accumulation hot water per unit time, also decreases correspondingly thereto. Hence, the internal combustion engine is not sufficiently preheated, or it takes much time to preheat the internal combustion engine.

(c) When supplying the heater core with the high-temperature cooling water flowing out of the internal combustion engine, the cooling water having flowed from the internal combustion engine flows into the heater core after via the electrically-driven pump, the electric heater and the heat accumulation tank, whereby the flow resistance of the cooling water rises. In this case, a flow quantity of the cooling water flowing into the heater core per unit time decreases, and a quantity of the heat transferred to the air for heating from the cooling water per unit time in the heater core, also decreases corresponding thereto, with the result that the heating performance decreases.

Note that it can be considered for overcoming the problems (b) and (c) given above to individually provide a water passageway bypassing the heater core, a water passageway bypassing the electrically-driven pump and a water passageway bypassing the heat accumulation tank. A problem is, however, that the cooling water circulation circuit becomes complicated, and this leads to a poor mountability of the vehicle heating system into the vehicle.

SUMMARY OF THE INVENTION

It is a primary object of the present invention, which was devised to obviate the variety of problems described above, to provide a technology capable of efficiently promptly transferring a desired quantity of heat to an internal combustion engine or a heater core or a heat accumulation system in the internal combustion engine including the heat accumulation system for reserving a heat carrier in a way that keeps the heat.

To accomplish the above object, according to a first aspect of the present invention, an internal combustion engine including a heat accumulation system, comprises an internal combustion engine body cooled or heated by circulating a heat carrier, a heater core for exchanging the heat between the heat carrier and the air for heating an interior of a car room, a heat accumulation system for reserving the heat carrier in a way that keeps the heat, a heat carrier heating mechanism for heating the heat carrier, a first heat carrier circulation route extending in circulation through the heat carrier heating mechanism and the heat core without through the internal combustion engine body, a second heat carrier circulation route extending in circulation through the heat carrier heating mechanism and the heat accumulation system without through the internal combustion engine body, and a third heat carrier circulation route extending in circulation through the internal combustion engine body and the heat accumulation system.

According to this construction, on the first heat carrier circulation route along which the heat carrier circulates through the heat carrier heating mechanism and the heater core, the heat carrier heated by the heat carrier heating mechanism is supplied to the heater core without via the internal combustion engine body. Further, on the second heat carrier circulation route along which the heat carrier circulates through the heat carrier heating mechanism and the heat accumulation system, the heat carrier heated by the heat carrier heating mechanism is supplied to the heat accumulation system without via the internal combustion engine body. Moreover, on the third heat carrier circulation route along which the heat carrier circulates through the internal combustion engine body and the heat accumulation system, the heat carrier reserved in the hear accumulation system in a way that keeps the heat can be supplied to the internal combustion engine body.

The cooling water and a lubrication oil maybe exemplified as the heat carriers according to the present invention. Further, a combustion type heater for heating the heat carrier with combustion heat by burning a fuel in a combustion chamber separate from the internal combustion engine body, and an electric heater for heating the heat carrier by converting an electric energy into a thermal energy.

In the internal combustion engine including the heat accumulation system according to the first aspect of the present invention, the first heat carrier circulation route, the second heat carrier circulation route and the third heat carrier circulation route may have a route in common to each other, and a pump mechanism for feeding the heat carrier by pressure may be disposed on the common route.

In this case, the circulation of the heat carrier along the first heat carrier circulation route, the circulation of the heat carrier along the second heat carrier circulation route and the circulation of the heat carrier along the third heat carrier circulation route, can be attained by the single pump mechanism.

In the internal combustion engine including the heat accumulation system according to the present invention, the above circulation of the heat carrier can be established no only in a case where the first heat carrier circulation route and the second heat carrier circulation route have their route segment common to each other but also in a case where all the passageways of the first heat carrier circulation route are coincident with all the passageways of the second heat carrier circulation route, i.e., the first and second heat carrier circulation routes share all their passageways. In this case, the heat accumulation system as a whole can be constructed with a light weight.

In the internal combustion engine including the heat accumulation system according to the first aspect of the present invention, the heat carrier heating mechanism, the heater core, the pump mechanism and the heat accumulation system may be disposed on a route common to the first heat carrier circulation route and the second heat carrier circulation route as well as being disposed in series in this sequence in a flowing direction of the heat carrier.

In the thus constructed internal combustion engine including the heat accumulation system, the heater core is positioned just downstream of the heat carrier heating mechanism, and hence the heat given to the heat carrier from the heat carrier heating mechanism can be supplied to the heater core at a high efficiency.

The internal combustion engine including the heat accumulation system according to the first aspect of the present invention may further comprise a first short-circuit passageway, diverging from more downstream in the heat carrier flowing direction than the heat accumulation system and connected to an upstream point of the heat carrier heating mechanism, for configuring a route extending in circulation through the heat carrier heating mechanism, the heater core, the pump mechanism and the heat accumulation system.

In the thus constructed internal combustion engine including the heat accumulation.

In the thus constructed internal combustion engine including the heat accumulation system, the route along which the heat carrier circulates through the heat carrier heating mechanism, the heater core, the pump mechanism and the heat accumulation system without via the internal combustion engine, can be easily configured.

The internal combustion engine including the heat accumulation system according to the first aspect of the present invention may further comprise a second short-circuit passageway, diverging from more downstream in the heat carrier flowing direction than the heat carrier heating mechanism, connected to an upstream point of the pump mechanism and bypassing the heater core.

In the thus constructed internal combustion engine including the heat accumulation system, the heat carrier heated by the heat carrier heating mechanism can be circulated without via the heater core, and therefore the high-temperature heat carrier heated by the heat carrier heating mechanism can arrive at the heat accumulation system without via the heater core.

In the internal combustion engine including the heat accumulation system according to the first aspect of the present invention, the heater core and the heat accumulation system may be disposed in parallel with each other in the heat carrier flowing direction, and the first heat carrier circulation route and the second heat carrier circulation route may be configured so that a route extending in circulation through the pump mechanism, the heat accumulation system, the heat carrier heating mechanism and the heater core without via the internal combustion engine body, can be formed.

In the thus constructed internal combustion engine including the heat accumulation system, it is feasible to selectively configure the circulation circuit in which the heat carrier flows via all of the internal combustion engine body, the heat carrier heating mechanism, the heater core, the pump mechanism and the heat accumulation system, the circulation circuit in which the heat carrier flows via only the internal combustion engine body and the pump mechanism, the circulation circuit in which the heat carrier flows via only the pump mechanism, the heat accumulation system, the heat carrier heating mechanism and the heater core, and the circulation circuit in which the heat carrier flows via only the internal combustion engine body, the heat carrier heating mechanism and the heater core without individually providing the passageway bypassing the heater core and the passageway bypassing the heat accumulation system and the pump mechanism.

In the internal combustion engine including the heat accumulation system substantially according to the first aspect of the present invention, the heat carrier heating mechanism may be disposed more downstream in the heat carrier flowing direction than the heater core and more upstream than the heat accumulation system on the first heat carrier circulation route and the second heat carrier circulation route.

In this case, the heat accumulation system is disposed just downstream of the heat carrier heating mechanism, and it is therefore possible for the heat accumulation system to accumulate the heat given to the heat carrier from the heat carrier heating mechanism at a high efficiency.

To accomplish the above object, according to a second aspect of the present invention, an internal combustion engine including a heat accumulation system, comprises heat carrier flow passageways, formed in a cylinder head and a cylinder block of the internal combustion engine, for flowing a heat carrier through, a heat accumulation system for reserving the heat carrier in a way that keeps the heat, a heat carrier supply mechanism for supplying the heat carrier in the heat accumulation system to the heat carrier flow passageway of at least the cylinder head of the internal combustion engine when or before starting up the internal combustion engine, and a heat carrier supply stopping mechanism for stopping the supply of the heat carrier to the heat carrier flow passageway from the heat accumulation system when a predetermined condition is established after the heat carrier supply mechanism has started supplying the heat carrier.

In the thus constructed internal combustion engine including the heat accumulation system, the heat carrier supply stopping mechanism supplies the heat carrier flow passageway in the cylinder head with the high-temperature heat carrier reserved in the heat accumulation system when or before starting up the internal combustion engine.

Upon a start of the supply of the heat carrier to the internal combustion engine from the heat accumulation system, the heat carrier supply stopping mechanism judges whether or not a predetermined condition is established. The predetermined condition is, for example, that a quantity of the heat carrier supplied to the hat carrier flow passageway from the heat accumulation system be equal to or larger than a predetermined quantity, and preferably that the high-temperature heat carrier reserved in the heat accumulation system flows in spread through at least the heat carrier flow passageway in the cylinder head (i.e., the low-temperature heat carrier staying in the heat carrier flow passageway in the cylinder head flows out of this heat carrier flow passageway, and, in place of this low-temperature heat carrier, the high-temperature heat carrier reserved in the heat accumulation system flows in spread through the heat carrier flow passageway).

The following is what can be exemplified as a method of judging that the quantity of the heat carrier supplied to the heat carrier flow passageway from the heat accumulation system is equal to or larger than the predetermined quantity. One method is to presume that a predetermined or larger quantity of heat carrier has been supplied to the heat carrier flow passageway from the heat accumulation system when a predetermined time elapses since the heat accumulation system has started supplying the heat carrier to the heat carrier flow passageway. Another method is to presume that a predetermined or larger quantity of heat carrier has been supplied to the heat carrier flow passageway from the heat accumulation system when a temperature of the cylinder head of the internal combustion engine becomes equal to or higher than a predetermined temperature. A further method is to presume that a predetermined or larger quantity of heat carrier has been supplied to the heat carrier flow passageway from the heat accumulation system when a temperature of a predetermined portion of the heat carrier flow passageway becomes equal to or higher than a predetermined temperature.

The heat carrier supply stopping mechanism may permit the supply of the heat carrier by the heat carrier supply mechanism till the predetermined condition described above is established, and stops the supply of the heat carrier by the heat carrier supply mechanism when the predetermined condition is established. Note that the hat carrier supply stopping mechanism may, after the predetermined condition has been established, permit the circulation of the heat carrier as far as an interior of the internal combustion engine is concerned.

In this case, it follows that the high-temperature heat carrier supplied from the heat accumulation system stays in or circulates through the heat carrier flow passageway, thereby restraining the low-temperature heat carrier previously staying in the heat carrier flow passageway from flowing again into the heat carrier flow passageway.

As a result, at least the cylinder head of the internal combustion engine receives the heat of the heat carrier and immediately rises in temperature. Temperatures of a wall surface of an intake port and of a wall surface of a combustion chamber also rise corresponding thereto, whereby the air sucked by the internal combustion engine receives the heat from the wall surfaces of the intake port and of the combustion chamber, and increases in temperature.

The internal combustion engine including the heat accumulation system according to the second aspect of the present invention may further comprise a fuel injection inhibiting unit for inhibiting a fuel injection of the internal combustion engine during the supply of the heat carrier by the heat carrier supply mechanism to the heat carrier flow passageway from the heat accumulation system.

In this case, after the heat carrier supply stopping mechanism has stopped the supply of the heat carrier to the heat carrier flow passageway from the heat accumulation system, specifically, the high-temperature heat carrier reserved in the heat accumulation system flows in spread through the heat carrier flow passageway of the internal combustion engine, and thereafter the fuel injection is started.

As a result, the fuel injection is started after the temperature of the suction air has been raised. Therefore, the fuel becomes easy to vaporize, and the quantity of the fuel adhered to the wall surfaces of the intake port and of the combustion chamber decreases.

The internal combustion engine including the heat accumulation system according to the third aspect of the present invention may further comprise a cranking unit for starting the cranking of the internal combustion engine after the heat carrier supply stopping mechanism has stopped the supply of the heat carrier to the heat carrier flow passageway from the heat accumulation system.

This is based on an assumption of the internal combustion engine including a mechanical pump for feeding by pressure the heat carrier by utilizing a rotational torque of an output shaft of the engine. It is because there might be a case where, if the cranking of the internal combustion engine is started when the heat carrier supply mechanism supplies the heat carrier to the heat carrier flow passageway from the heat accumulation system with the result that the mechanical pump is to be operated, the high-temperature heat carrier supplied to the heat carrier flow passageway from the heat accumulation system unnecessarily flows out of the heat carrier flow passageway, or the low-temperature heat carrier having flowed out of the heat carrier flow passageway flows again into the heat carrier flow passageway.

The internal combustion engine including the heat accumulation system substantially according to the second aspect of the present invention may further comprise, in addition to the cranking unit described above, a fuel injection inhibiting unit for inhibiting the fuel injection of the internal combustion engine during a predetermined period since the cranking unit has started the cranking of the internal combustion engine.

In this case, a compression by only suction takes place in each of the cylinders of the internal combustion engine during a predetermined period since the cranking of the internal combustion engine has been started, and the wall surface inside the cylinder is warmed by the heat evolved when the suction air is compressed. As a consequence, it does not happen that the heat of the suction air is unnecessarily radiated to the wall surface inside the cylinder after the fuel injection has been started.

In the internal combustion engine including the heat accumulation system according to the third aspect of the present invention, the heat carrier supply mechanism may have a heat carrier passageway for connecting the heat carrier flow passageway to the heat accumulation system, and a pump mechanism, operating independently of the internal combustion engine, for feeding the heat carrier by pressure existing in the heat carrier passageway.

In this case, the heat carrier in the heat accumulation system can be supplied to the heat carrier flow passageway by operating the pump mechanism even before starting up the internal combustion engine. Then, the heat carrier supply stopping mechanism stops the supply of the heat carrier to the internal combustion engine from the heat accumulation system by stopping the operation of the pump mechanism just when a predetermined condition is established.

To accomplish the above object, according to a third aspect of the present invention, an internal combustion engine including a heat accumulation system, comprises an internal combustion engine body cooled or heated by circulating a heat carrier, a heater core for exchanging the heat between the heat carrier and the air for heating an interior of a car room, a heat carrier flow circuit for circulating the heat carrier via sand internal combustion engine body and the heater core, a bypass connected to the heat carrier flow circuit so as to bypass the heater core, a heat accumulation system, provided on the bypass, for reserving the heat carrier in a way that keeps the heat, and a pump mechanism, provided on the bypass, for feeding the heat carrier by pressure existing in the bypass.

In the thus constructed internal combustion engine including the heat accumulation system, the heat accumulation system and the pump mechanism are disposed on the bypass that bypasses the heater core, and it therefore follows that the heat accumulation system and the pump mechanism are positioned in parallel with the heater core in the flowing direction of the heat carrier.

When the heat accumulation system and the pump mechanism are in such a positional relationship as to be parallel with the heater core, it is feasible to selectively configure the circulation circuit in which the heat carrier flows via all of the internal combustion engine, the heater core, the heat accumulation system and the pump mechanism, the circulation circuit in which the heat carrier flows via only the internal combustion engine, the heat accumulation system and the pump mechanism, the circulation circuit in which the heat carrier flows via only the heat accumulation system, the pump mechanism and the heater core, and the circulation circuit in which the heat carrier flows via only the internal combustion engine and the heater core without individually providing the passageway bypassing the heater core and the passageway bypassing the heat accumulation system and the pump mechanism.

For instance, in the case of preheating the internal combustion engine in advance of starting up the internal combustion engine, the circulation circuit in which the heat carrier flows via only the internal combustion engine, the heat accumulation system and the pump mechanism, is configured, and the pump mechanism is operated.

In this case, the high-temperature heat carrier in the heat accumulation system flows into the internal combustion engine without via the heater core, and it does not happen that a flow resistance of the heat carrier increases on the flow route extending from the heat accumulation system to the internal combustion engine.

As a result, there decreases neither a flow quantity of the heat carrier flowing into the internal combustion engine per unit time nor a quantity of the heat transferred to the internal combustion engine from the heat carrier per unit time corresponding thereto.

Further, when heating the air for heating an interior of a car room under such a condition that the temperature of the heat carrier flowing out of the internal combustion engine is comparatively high, the circulation circuit in which the heat carrier flows via only the internal combustion engine and the heater core, is configured.

In this case, the high-temperature heat carrier having flowed out of the internal combustion engine flows into the heater core without via the heat accumulation system and the pump mechanism, and there is no possibility in which the flow resistance of the heat carrier increases on the flow route extending from the internal combustion engine to the heater core.

As a consequence, there decreases neither a flow quantity of the heat carrier flowing into the heater core per unit time nor a quantity of the heat transferred to the car room interior heating air from the heat carrier per unit time corresponding thereto.

The internal combustion engine including the heat accumulation system according to the third aspect of the present invention may further comprise a shut-off mechanism for shutting off a flow of the heat carrier into the bypass and/or the heater core.

This is because the heat carrier is prevented from unnecessarily flowing into the heater core in the case of configuring the circulation circuit in which the heat carrier flows via only the internal combustion engine, the heat accumulation system and he pump mechanism in order to preheat the internal combustion engine in advance of starting up the internal combustion engine or because the heat carrier is prevented from unnecessarily flowing into the heat accumulation system in the case of configuring the circulation circuit in which the heat carrier flows via only the internal combustion engine and the heater core in order to preheat the car room interior heating air under such a condition that the temperature of the heat carrier flowing out of the internal combustion engine is comparatively high.

In the internal combustion engine including the heat accumulation system according to the third aspect of the present invention, the heat accumulation system may have a heat carrier inflow port via which the heat carrier flowing through the bypass flows into the heat accumulation system, and a heat carrier outflow port via which the heat carrier in the heat accumulation system flows out toward the bypass, and the heat carrier inflow port and/or the heat carrier outflow port may be provided with a counterflow preventive mechanism for preventing a counterflow of the heat carrier.

In this case, the low-temperature cooling water in the heat carrier circulation circuit and in the bypass does not unnecessarily flow into the heat accumulation system.

In the internal combustion engine including the heat accumulation system according to the third aspect of the present invention, the internal combustion engine may include a head-sided cooling water passageway along which the heat carrier flows through a cylinder head, and a block-sided cooling water passageway along which the heat carrier flows through a cylinder block, and the heat accumulation system and the pump mechanism may be, when preheating the internal combustion engine in advance of starting up the internal combustion engine, constructed so that the heat carrier reserved in the heat accumulation system flows into the head-sided cooling water passageway and subsequently into the block-sided cooling water passageway.

In this case, the heat carrier supplied to the internal combustion engine from the heat accumulation system flows into the head-sided cooling water passageway and subsequently into the block-sided cooling water passageway, and hence the heat of the heat carrier is transferred preferentially to the cylinder head.

As a result, there rises a temperature of each of the wall surfaces of the combustion chamber and of the intake port provided in the cylinder head, and vaporization of the fuel is speeded up when and after starting up the internal combustion engine. In addition, a temperature of an air/fuel mixture is raised, and it is possible to enhance a start-up property, stabilize the combustion and speed up a warm-up.

According to a fourth aspect of the present invention, a heat carrier supply control system comprises a heat-supplied body formed with a heat carrier flow passageway for flowing a heat carrier therethrough, a heat carrier supply mechanism for supplying the heat carrier to a heat carrier flow passageway of the heat-supplied body, and a heat carrier supply stopping mechanism for stopping a supply of the heat carrier to the heat-supplied body when a predetermined condition is established after the heat carrier supply mechanism has started supplying the heat carrier.

What needs the warm-up at a cold time as in the case of the internal combustion engine, a fuel injection valve of the internal combustion engine, an electric motor, a transmission, a battery etc, may be exemplified as the heat-supplied body defined herein.

In the thus constructed heat carrier supply control system, the heat carrier supply mechanism supplies the high-temperature heat carrier to the heat carrier flow passageway of the heat supplied-body at the cold time etc of the heat-supplied body.

When the heat carrier supply mechanism starts supplying the heat carrier to the heat-supplied body from the heat accumulation system, the heat carrier supply stopping mechanism judges whether or not a predetermined condition is established. The predetermined condition given above is, for example, that the quantity of the heat carrier supplied to the heat carrier flow passageway is equal to or larger than a predetermined quantity (which is equal to or larger than, e.g., 50%, 70%, 80%, 90% or 100% of the capacity of the heat carrier flow passageway)

The heat carrier supply stopping mechanism permits the supply of the heat carrier by the heat carrier supply mechanism till the predetermined condition described above is established, and stops the supply of the heat carrier by the heat carrier supply mechanism when the predetermined condition is established. Note that the heat carrier supply stopping mechanism may permit the circulation of the heat carrier as far as an interior of the heat-supplied body is concerned after the predetermined condition has been established.

In this case, the high-temperature heat carrier supplied by the heat carrier supply mechanism mainly stays in or circulates through the heat carrier flow passageway of the heat-supplied body, and, even if the heat carrier supply mechanism and the heat carrier flow passageway communicate with each other via a circulation route, the low-temperature heat carrier previously staying in the heat carrier flow passageway is retrained from flowing again into the heat carrier flow passageway.

As a result, the heat of the heat-supplied body is not absorbed by the low-temperature heat carrier, and the heat-supplied body receives the heat of the high-temperature heat carrier and immediately rises in temperature.

BRIEF DESCRIPTION OF THE DRAWINGS

FIG. 22 is a diagram (1) showing a flow of the cooling water in the case of operating the car room interior heating system when stopping the operation of the internal combustion engine body;

FIG. 24 is a flowchart showing a preheating control routine in a sixth embodiment of the internal combustion engine including the heat accumulation system according to the present invention.

DESCRIPTION OF THE PREFERRED EMBODIMENTS

Specific embodiments of an internal combustion engine including a heat accumulation system according to the present invention, will hereinafter be described with reference to the accompanying drawings.

<First Embodiment>

To start with, a first embodiment of the present invention will be discussed referring to FIGS. 1 through 5.

Figure 1:
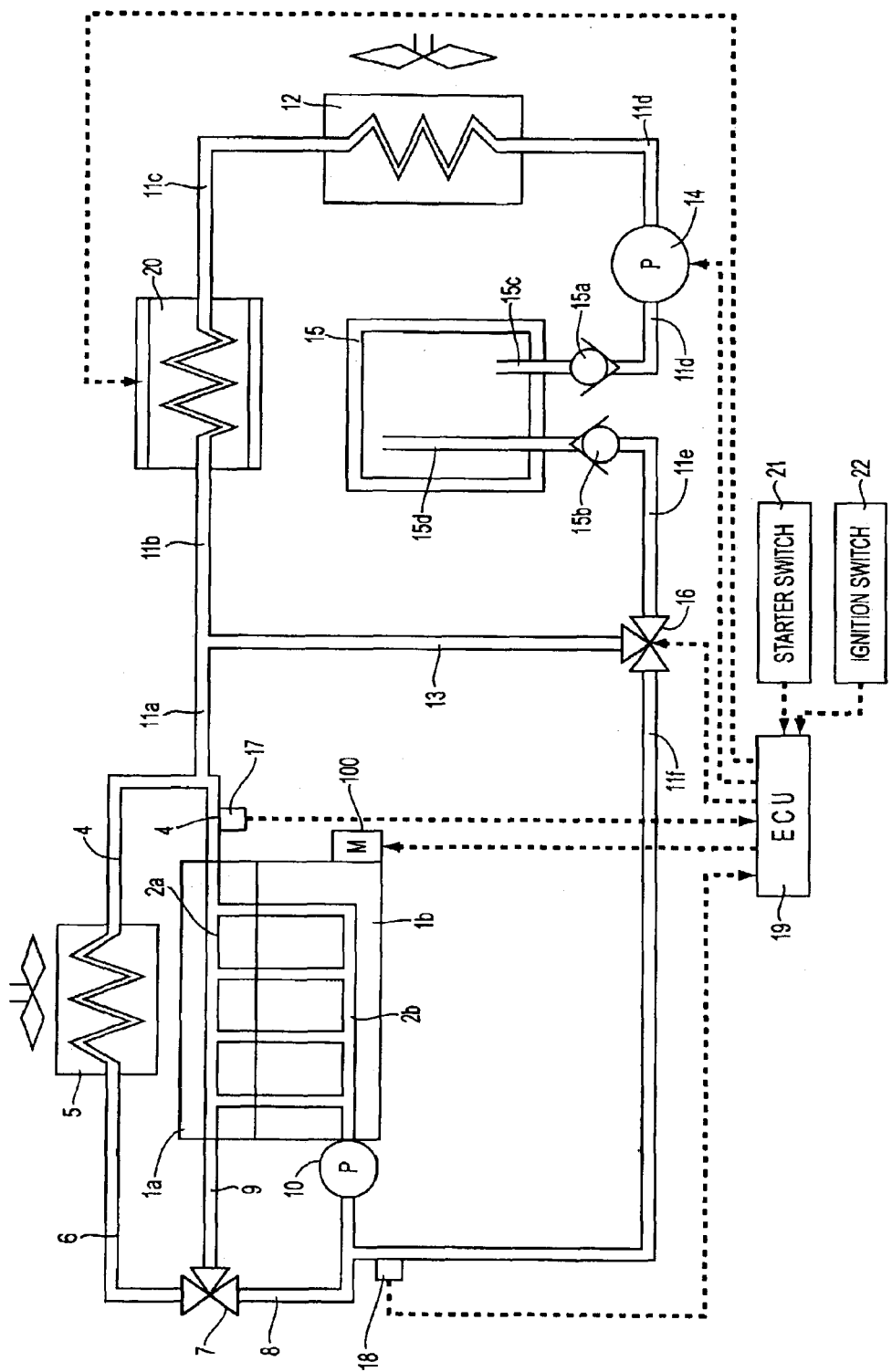
FIG. 1 is a diagram showing a configuration of a cooling water circulation system in a first embodiment of an internal combustion engine including a heat accumulation system according to the present invention.

FIG. 1 is a diagram schematically showing a configuration of a cooling system of a water cooled internal combustion engine, for driving a vehicle, mounted in the vehicle.

Referring to FIG. 1, an internal combustion engine body 1 may be classified as a water cooled internal combustion engine operated by use of gasoline or a light oil is used as a fuel. The internal combustion engine body 1 has a cylinder head 1a and a cylinder block 1b. This internal combustion engine body 1 corresponds to a body supplied with the heat (heat-supplied body) according to the present invention.

A starter motor 100 for rotating an unillustrated crank shaft of the internal combustion engine body 1 when the electric power for driving is applied, is attached to the internal combustion engine body 1.

The cylinder head 1a and the cylinder block 1b are formed respectively with a head-sided cooling water passageway 2a and a block-sided cooling water passageway 2b each serving to circulate the cooling water as a heat carrier. The head-sided cooling water passageway 2a and the block-sided cooling water passageway 2b communicate with each other.

A first cooling water passageway 4 is connected to the head-sided cooling passageway 2a and further connected to a cooling water inflow port of a radiator 5. A cooling water outflow port of the radiator 5 is connected via a second cooling water passageway 6 to a thermostat valve 7.

In addition to the second cooling water passageway 6, a third cooling water passageway 8 and a fourth cooling water passageway 9 are connected to the thermostat valve 7. The third water cooling passageway 8 is connected to a suction port of a mechanical water pump 10 driven by a rotational torque of the unillustrated crank shaft. A discharge port of the mechanical water pump 10 is connected to the block-sided cooling water passageway 2b. On the other hand, the fourth cooling water passageway 9 communicates with the head-sided cooling water passageway 2a.

The thermostat valve 7 may be classified as a passageway switch valve for closing and opening any one of the second and fourth cooling water passageways 6, 9 in accordance with a temperature of the cooling water flowing therethrough. To be specific, the thermostat valve 7, when the temperature of the cooling water flowing through the thermostat valve 7 is equal to or lower than a predetermined valve opening temperature $T_1$, shuts off the second cooling water passageway 6 and simultaneously opens the fourth cooling water passageway 9, whereby the third cooling water passageway 8 and the fourth cooling water passageway 9 communication with each other. Further, the thermostat valve 7, when the temperature of the cooling water flowing through the thermostat valve 7 is equal to or higher than the predetermined valve opening temperature $T_1$, opens off the second cooling water passageway 6 and simultaneously shuts off the fourth cooling water passageway 9, whereby the third cooling water passageway 8 and the second cooling water passageway 6 communication with each other.

Next, the proximal end of a heater hose is connected to midway of the first cooling water passageway 4. The terminal of the heater hose 11 is connected to midway of the third cooling water passageway 8 through which the thermostat valve 7 and the mechanical water pump 10 are connected to each other.

A cooling water heating mechanism 20, a heater core 12, an electrically-driven pump 14 and a heat accumulation container 15 are disposed midways of the heater hose 11 in sequence from the proximal end of the heater hose 11.

The cooling water heating mechanism 20 may be defined as one mode of a heat carrier heating mechanism according to the present invention and is also a mechanism for heating the cooling water with a heat source other than the heat evolved in the internal combustion engine body 1. A combustion heater and an electric heater may be exemplified as this type of cooling water heating mechanism 20.

The heater core 12 is a heat exchanger for transferring the heat held by the cooling water to the air for heating an interior of a car room.

The electrically-driven pump 14 is a pump driven by an electric motor, and is constructed to discharge, from the discharge port at predetermined pressure, the cooling water sucked from the suction port of the electrically-driven water pump 14. This electrically-driven water pump 14 may be defined as one mode of a pump mechanism according to the present invention.

The heat accumulation container 15 is a container for reserving the cooling water in a heat retaining state. The heat accumulation container 15 has a cooling water inlet 15d for an inflow of the cooling water into the heat accumulation container 15 from the heater hose 11, and a cooling water outlet 15d for an outflow of the cooling water flow toward the heater hose 11 from within the heat accumulation container 15. The cooling water inlet 15c and the cooling water outlet 15d are provided with one-way valves 15a, 15b for each preventing a counterflow of the cooling water.

The thus constructed heat accumulation container 15, when fresh cooling water flows in from the cooling water inlet 15c, discharges instead high-temperature cooling water (which will hereinafter be called heat accumulation hot water) reserved in the heat accumulation container 15.

Note that the cooling water inlet 15c of the heat accumulation container 15 is to be connected via the heater hose 11 to the discharge port of the electrically-driven water pump 14, and the discharge port 15d of the heat accumulation container 15 is to be connected via the heater hose 11 to the third cooling water passageway 8.

The heater hose 11 is provided with a bypass 13 for connecting a portion between the proximal end of the heater hose 11 and the cooling water heating mechanism 20 to a portion between the terminal of the heater hose 11 and the heat accumulation container 15.

Herein, of the heater hose 11 extending between the first cooling water passageway 4 and the cooling water heating mechanism 20, a hose segment extending from the connecting point with the bypass 13 up to the first cooling water passageway 4 is called a first heater hose 11a, while a hose segment extending from the same connecting point down to the cooling water heating mechanism 20 is referred to as a second heater hose 11b. A hose segment of the heater hose 11 that extends from the heater core 12 to the heat accumulation container 15, is called a fourth heater hose 11d. A hose segment of the heater hose 11 that extends from the cooling water heating mechanism 20 down to the heater core 12, is called a third heater hose 11c. Further, of the heater hose 11 between the heat accumulation container 15 and the third cooling water passageway 8, a hose segment extending from the connecting point with the bypass 13 down to the heat accumulation container 15, is called a fifth heater hose 11e, and another hose segment extending from the same connecting point up to the third cooling water passageway 8 is called a sixth heater hose 11f.

A flow path switch valve 16 is provided at the connecting point of the bypass 14 to the fifth and sixth heater hoses 11e, 11f. This flow path valve 16 is a valve for selectively switching a connection between the three passageways and a shut-off of any one of these three passageways. The flow path switch valve 16 is driven by an actuator constructed of, e.g., an unillustrated step motor.

A first water temperature sensor 17 for outputting an electric signal corresponding to a temperature of the cooling water flowing through the first cooling water passageway 4, is fitted to a portion, in close vicinity of the internal combustion engine body 1, of the first cooling water passageway 4.

A second water temperature sensor 18 for outputting an electric signal corresponding to a temperature of the cooling water flowing through the third cooling water passageway 8, is fitted in the vicinity of the connecting point, to the third cooling water passageway 8, of the sixth heater hose 11f.

An electronic control unit (ECU) 19 for controlling the thus configured cooling system of the internal combustion engine body 1, is provided aside of this cooling system. This ECU 19 may be an ECU for controlling only the cooling water circulation system or an ECU serving to control both of the cooling water circulation system and the internal combustion engine body 1.

In addition to the first and second water temperature sensors 17, 18 described above, a starter switch 21 and an ignition switch 22, which are attached within the car room, are electrically connected to the ECU 19. The electrically-driven water pump 14, the flow path switch valve 16, the cooling water heating mechanism 20 and a starter motor 100, are also electrically connected to the ECU 19. The ECU 19 is capable of controlling the electrically-driven water pump 14, the flow path switch valve 16, the cooling water heating mechanism 20 and the starter motor 100, wherein the values relative to the operating states of the internal combustion engine body 1 and to the output signals of the variety of sensors, are used as parameters.

Functions of the internal combustion engine including the heat accumulation system in the first embodiment will hereinafter be explained.

Given at first is an explanation of a case of preheating the internal combustion engine body 1 in advance of starting up the internal combustion engine body 1. It is herein assumed that the high-temperature cooling water be reserved beforehand in the heat accumulation container 15.

The ECU 19, before a start of cranking of the internal combustion engine body 1, for instance, when the ignition switch 22 is turned ON from an OFF-state, controls the flow path switch valve 16 to shut off the bypass 13 and to open the fifth and sixth heater hoses 11e, 11f, and supplies the electrically-driven water pump 14 with the drive electric power in order to operate the electrically-driven water pump 14.

Figure 2:
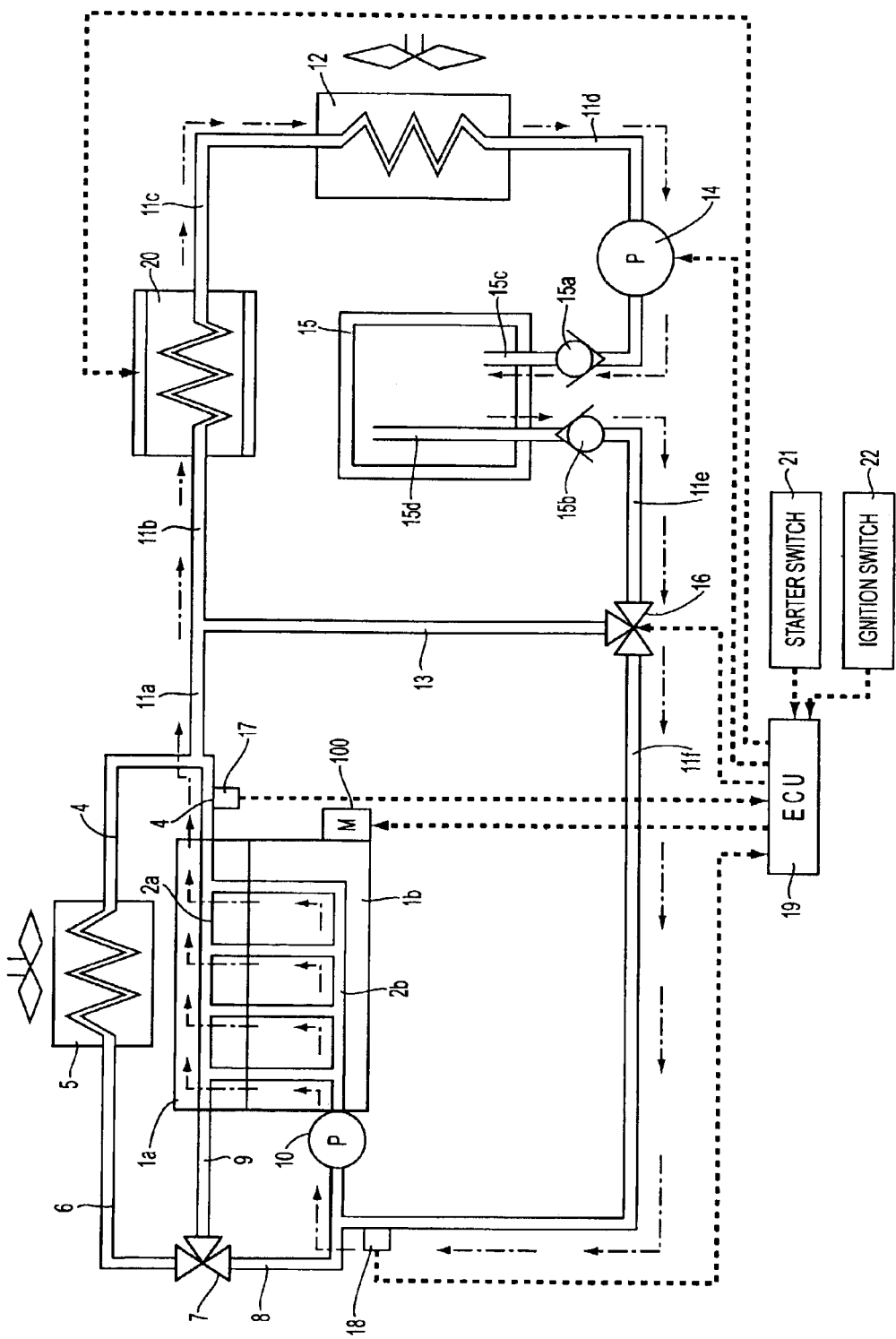
FIG. 2 is a diagram showing a flow of the cooling water when preheating an internal combustion engine body.

In this case, not the mechanical water pump 10 but the electrically-driven water pump 14 works, and hence, as shown in FIG. 2, there is formed a circulation circuit in which to flow the cooling water in the sequence such as the electrically water pump 14→the fourth heater hose 11d→the heat accumulation container 15→the fifth heater hose 11e→the flow path switch valve 16→the sixth heater hose 11f→the third cooling water passageway 8→the mechanical water pump 10→the block-sided cooling water passageway 2b→the head-sided cooling water passageway 2a→the first cooling water passageway 4→the first heater hose 11a→the second heater hose 11b→the cooling water heating mechanism 20→the third heater hose 11c→the heater core 12→the fourth heater hose 11d→the electrically-driven water pump 14. This circulation circuit corresponds to a third heat carrier circulation route according to the present invention.

When the circulation circuit described above has been formed, the cooling water discharged out of the electrically-driven water pump 14 flows into the heat accumulation container 15 via the fourth heater hose 11d. In place of this cooling water, the heat accumulation hot water reserved in the heat accumulation container 15 is discharged out of the heat accumulation container 15. The heat accumulation hot water discharged from the heat accumulation container 15 flows into the block-sided cooling water passageway 2b within the internal combustion engine body 1 via the fifth heater hose 11e, the sixth heater hose 11f and the third cooling water passageway 8, and subsequently flows into the head-sided cooling water passageway 2a.

Thus, when the heat accumulation hot water flows into the head-sided cooling water passageway 2a and the block-sided cooling water passageway 2b in the internal combustion engine body 1, in place of this hot water, the low-temperature cooling water staying previously in the head-sided cooling water passageway 2a and the block-sided cooling water passageway 2b, flows into the first cooling water passageway 4 from the head-sided cooling water passageway 2a and the block-sided cooling water passageway 2b.

As a result, in the internal combustion engine body 1, the heat of the heat accumulation hot water is transferred to wall surfaces of the head-sided cooling water passageway 2a and the block-sided cooling water passageway 2b, whereby the internal combustion engine body 1 is preheated.

Further, in the circulation circuit, the route extending from the heat accumulation container 15 to the internal combustion engine body 1 has no existence of the heater core, and hence unnecessary heat radiation from the heat accumulation hot water is prevented, with the result that the internal combustion engine body 1 is efficiently preheated.

When the internal combustion engine body 1 is thus preheated, it follows that atmospheric temperatures in an unillustrated intake port and cylinders of the internal combustion engine body 1 rise. As a result, vaporization of the fuel when and after starting up the internal combustion engine body 1, is speeded up, and a temperature of an air/fuel mixture rises at a compression stroke. Therefore, a quantity of the fuel attached to the wall surface decreases, and an ignitibility of the mixture enhances. This enhancement leads to an improvement of a start-up characteristic, stabilization of the fuel, and a reduction in warm-up operation time.

Note that it an output signal value (which implies a temperature of the cooling water flowing out of the internal combustion engine body 1) of the first water temperature sensor 17 is equal or lower than a predetermined temperature (e.g., 50° C.) when the circulation circuit described above is formed, the ECU 19 may raise the temperature of the cooling water circulating through the circulation circuit described above by operating the cooling water heating mechanism 20.

Next, when the starter switch 21 is turned ON from the OFF-state, the ECU 19, after stopping the supply of the drive electric power to the electrically-driven water pump 14, starts up the internal combustion engine body 1 by applying the drive electric power to the starter motor 100 and an unillustrated injection valve etc.

Upon a completion of the start-up of the internal combustion engine body 1, the mechanical water pump 10 is driven by the rotational torque of the crank shaft. Corresponding to this operation, the ECU 19 controls the flow path switch valve 16 in order to shut off the fourth heater hose 11d, and sets the electrically-driven water pump 14 in a stopping state.

Figure 3:
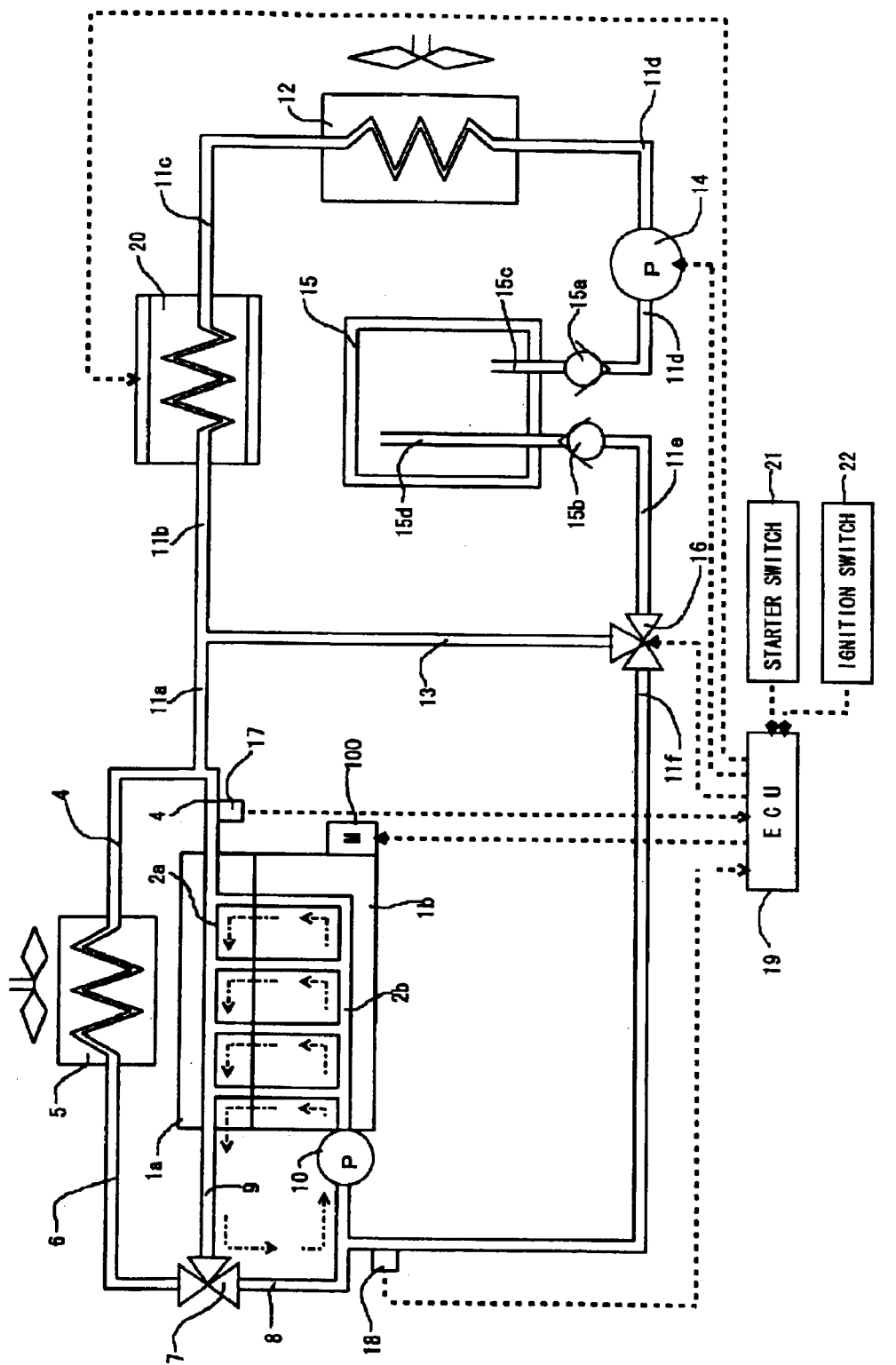
FIG. 3 is a diagram showing a flow of the cooling water when warming up the internal combustion engine body.

On this occasion, if the temperature of the cooling water is equal to or lower than a valve open temperature $T_1$ of the thermostat valve 7, the thermostat valve 7 shuts off the second cooling water passageway 6 and at the same time opens the fourth cooling water passageway 9. Hence, as shown in FIG. 3, there is formed a circulation circuit in which to flow the cooling water in the sequence such as the mechanical water pump 10→the block-sided cooling water passageway 2b→the head-sided cooling water passageway 2a→the fourth cooling water passageway 9→the thermostat valve 7→the third cooling water passageway 8→the mechanical water pump 10.

In this case, the cooling water exhibiting a comparatively low temperature, having flowed out of the internal combustion engine body 1 runs bypassing the radiator 5 and is not therefore cooled by the radiator 5 more than needed.

As a result, the internal combustion engine body 1 is not unnecessarily cooled by the cooling water, and it does not happen that the warm-up of the internal combustion engine body 1 is hindered.

Figure 4:
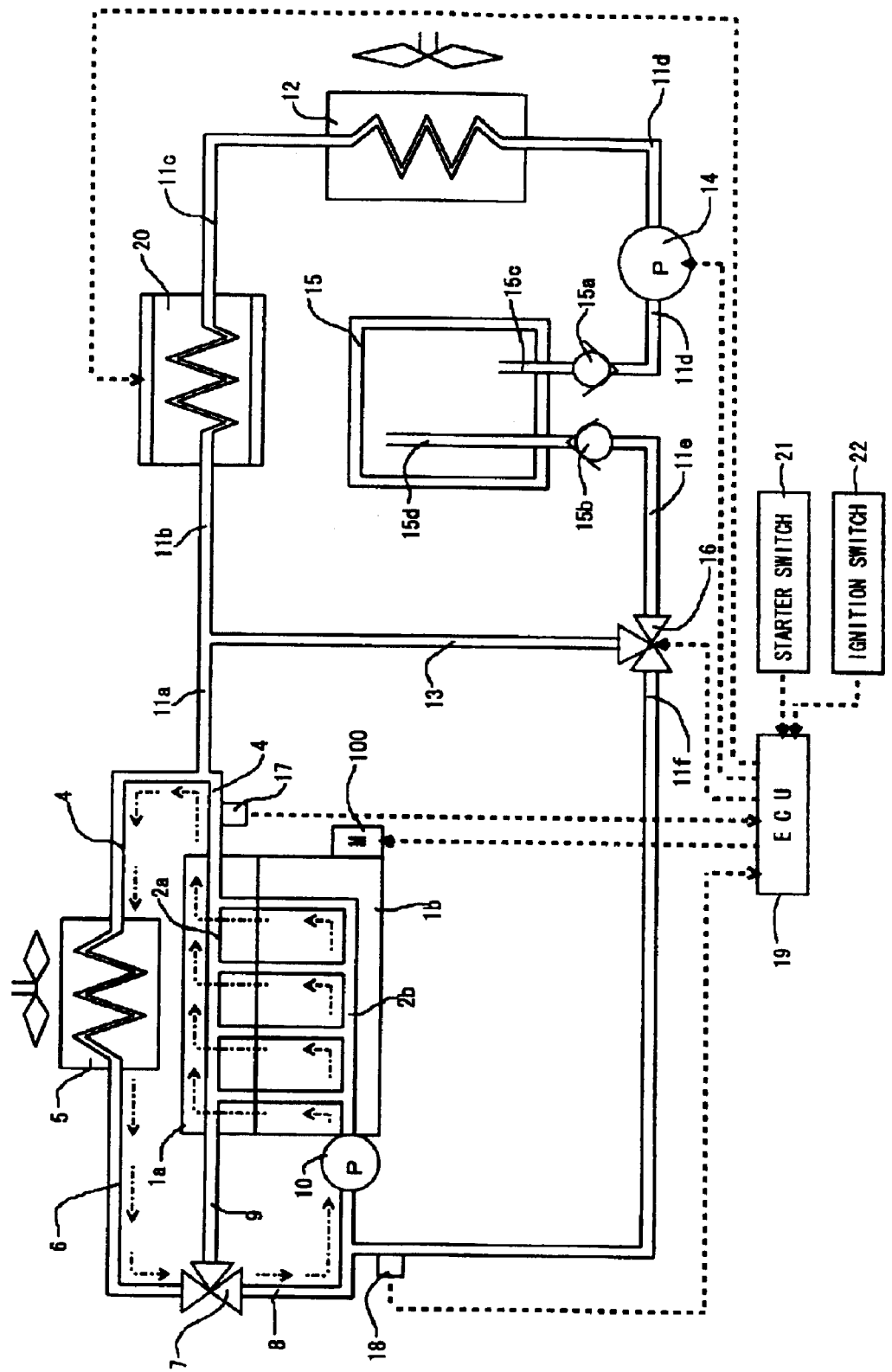
FIG. 4 is a diagram showing a flow of the cooling water when completing the warm-up of the internal combustion engine body.

Thereafter, if the temperature of the cooling water is equal to or higher than the valve open temperature $T_1$ of the thermostat valve 7, the thermostat valve 7 opens the second cooling water passageway 6 and at the same time shuts off the fourth cooling water passageway 9. Hence, as shown in FIG. 4, there is formed a circulation circuit in which to flow the cooling water in the sequence such as the mechanical water pump 10→the block-sided cooling water passageway 2b→the head-sided cooling water passageway 2a→the first cooling water passageway 4→the radiator 5→the second cooling water passageway 6→thermostat valve 7→the third cooling water passageway 8→the mechanical water pump 10.

In this case, the cooling water exhibiting a comparatively high temperature, having flowed out of the internal combustion engine body 1, runs through the radiator 5, and therefore the heat of the cooling water is radiated by the radiator 5. As a consequence, the cooling water having the comparatively low temperature after its heat has been radiated by the radiator 5, flows into the internal combustion engine body 1, thereby cooling the internal combustion engine body 1 with this cooling water.

Next, if a switch of an unillustrated car room interior heating system is turned ON when the internal combustion engine body 1 is in its operation state, the ECU 19 controls the flow path switch valve 16 to shut off the bypass 13 and connect the fifth and sixth heater hoses 11e, 11f with each other.

In this case, the electrically-driven water pump 14 comes to the stopping-state, and instead the mechanical water pump 10 is brought into the operation state. There is, however, formed the same circulation circuit as that explained referring to FIG. 2, i.e., in which to flow the cooling water in the sequence such as the mechanical water pump 10→the block-sided cooling water passageway 2b→the head-sided cooling water passageway 2a→the first cooling water passageway 4→the first heater hose 11a→the heater core 12→the fourth heater hose 11d→the electrically-driven water pump 14→the fourth heater hose 11d→the heat accumulation container 15→the fifth heater hose 11e→the flow path switch valve 16→the sixth heater hose 11f→the third cooling water passageway 8→the mechanical water pump 10.

In this circulation circuit, the high-temperature cooling water having flowed out of the internal combustion engine body 1 runs through the heater core 12, and hence the heat is exchanged between the air for heating the interior of the car room and the cooling water in the heater core 12. Namely, the heat of the cooling water is transferred to the air for heating the interior of the car room in the heater core 12. As a result, the air for heating the interior of the car room is warmed.

Note that when the circulation circuit described above is formed, the high-temperature cooling water having flowed out of the internal combustion engine body 1 circulates also inside the heat accumulation container 15, so that the heat accumulation container 15 becomes capable of accumulating the heat of the cooling water.

Explained herein is a case where the internal combustion engine body 1 in the first embodiment is mounted in a vehicle constructed to temporarily stop the operation of the internal combustion engine when the vehicle halts and so on.

The ECU 19, when the operation of the internal combustion engine body 1 is stopped in the ON-state of the switch of the heating system for heating the interior of the car room, controls the flow path switch valve 16 to shut off the sixth heater hose 11f and to connect the fifth heater hose 11e and the bypass 13 to each other, and also operates the electrically-driven water pump 14 and the cooling water heating mechanism 20.

Figure 5:
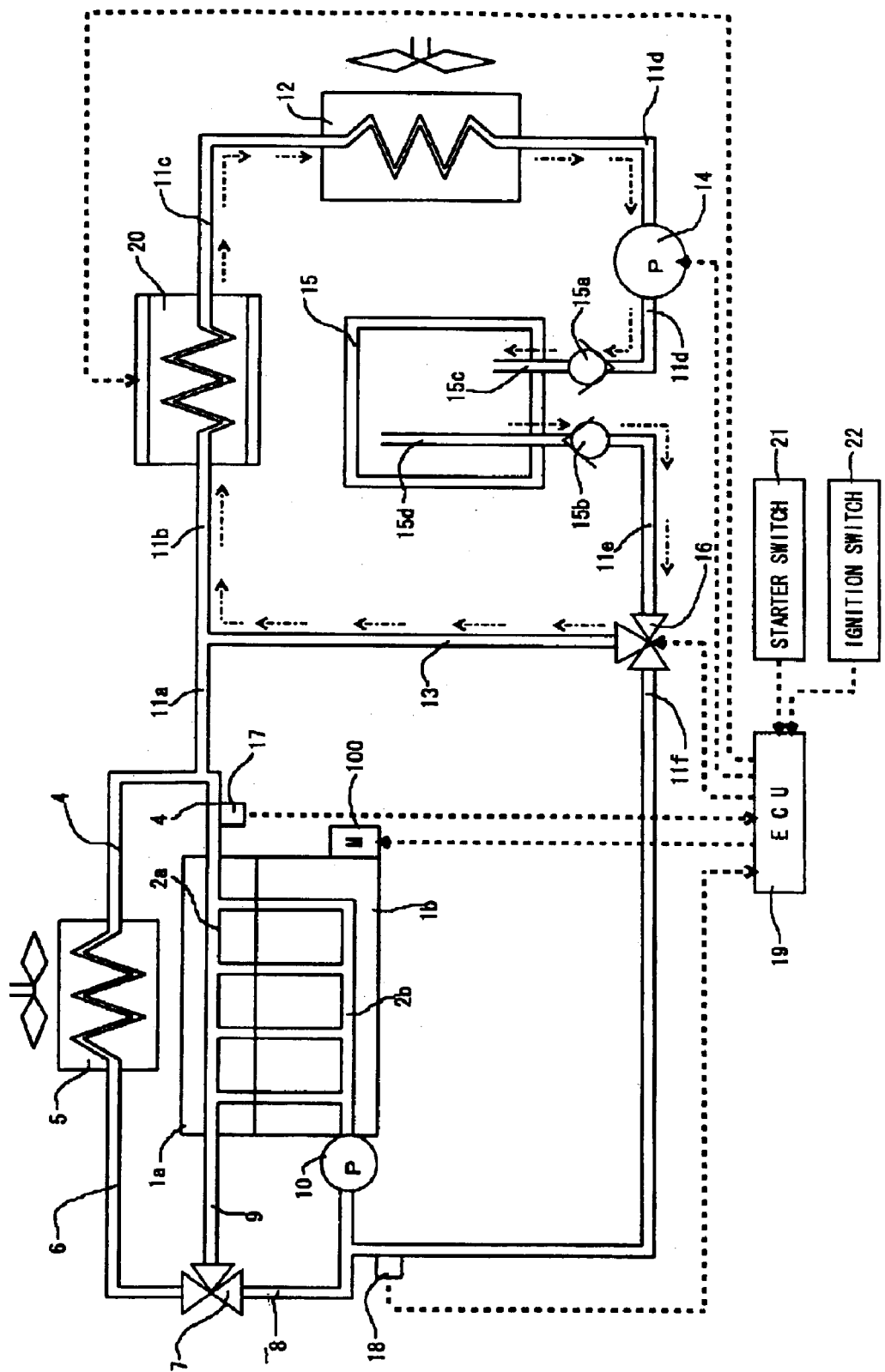
FIG. 5 is a diagram showing a flow of the cooling water in the case of operating a car room interior heating system when operating the internal combustion engine body.

In this case, not the mechanical water pump 10 but only the electrically-driven water pump 14 works, and, as shown in FIG. 5, there is formed a circulation circuit in which to flow the cooling water in the sequence such as the electrically water pump 14→the fourth heater hose 11d→the heat accumulation container 15→the fifth heater hose 11e→the flow path switch valve 16→the bypass 13—the second heater hoe 11b→the cooling water heating mechanism 20→the third heater hose 11c→the heater core 12→the fourth heater hose 11d→the electrically-driven water pump 14.

In this circulation circuit, the cooling water does not flow via the internal combustion engine body 1 and circulates through the heat accumulation container 15, the cooling water heating mechanism 20 and the heater core 12. As a result, the heat accumulation hot water reserved in the heat accumulation container 15 and/or the high-temperature cooling water heated by the cooling water heating mechanism 20 can reach the heater core 12 without flowing via the internal combustion engine body 1. Therefore, the heat of the cooling water is transferred to the heater core 12 without being absorbed by the internal combustion engine body 1.

Accordingly, if the operation of the internal combustion engine body 1 is stopped in the ON-state of the switch of the heating system for heating the interior of the car room, the heat of the cooling water is transferred to the heater core 12 without being absorbed by the internal combustion engine body 1. A performance of the car room interior heating system is efficiently increased.

Next, if there arises a necessity of reserving the high-temperature cooling water in the heat accumulation container 15 when the internal combustion engine body 1 is in the stopping state of its operation, the ECU 19 configures the same circulation circuit as the circulation circuit described referring to FIG. 5, and operates the cooling water heating mechanism 20.

In this case, the high-temperature cooling water heated by the cooling water heating mechanism 20 is supplied to the heat accumulation container 15 without flowing via the internal combustion engine body 1. Namely, the heat given to the cooling water from the cooling water heating mechanism 20 is supplied to the heat accumulation container 15 without being absorbed by the internal combustion engine body 1.

When the circulation circuit as shown in FIG. 5 is thus configured, the cooling water heating mechanism 20, whereby first and second heat carrier circulation routes according to the present invention are actualized.

As discussed above, the internal combustion engine including the heat accumulation system in the first embodiment is capable of forming the route along which the cooling water circulates through the cooling water heating mechanism 20 and the heater core 12 without flowing via the internal combustion engine body 1. Therefore, the heat given to the cooling water from the cooling water heating mechanism 20 is supplied to the heat accumulation container 15 without being absorbed by the internal combustion engine body 1. As a result, the performance of the car room interior heating system can be efficiently enhanced.

Moreover, the internal combustion engine including the heat accumulation system in the first embodiment is capable of forming the route along which the cooling water circulates through the cooling water heating mechanism 20 and the heat accumulation container 15 without flowing via the internal combustion engine body 1. Hence, the heat given to the cooling water from the cooling water heating mechanism 20 is supplied to the heat accumulation container 15 without being absorbed by the internal combustion engine body 1. As a consequence, the heat accumulation container 15 is capable of efficiently accumulating the heat.

Accordingly, the internal combustion engine including the heat accumulation system in the first embodiment is capable of efficiently preheating the internal combustion engine body 1, efficiently enhancing the performance of the car room interior heating system, and efficiently accumulating the heat in the heat accumulation container 15.

Moreover, the cooling water circulation system in the first embodiment can be actualized with a simple structure and therefore has an effect of exhibiting an excellent mountability on the vehicle.

<Second Embodiment>

Next, a second embodiment of the internal combustion engine including the heat accumulation system according to the present invention, will be discussed with reference to FIGS. 6 and 7. Herein, the discussion will be focused on a different configuration from that in the first embodiment discussed above, and the repetitive explanation of the same construction is omitted.

Figure 6:
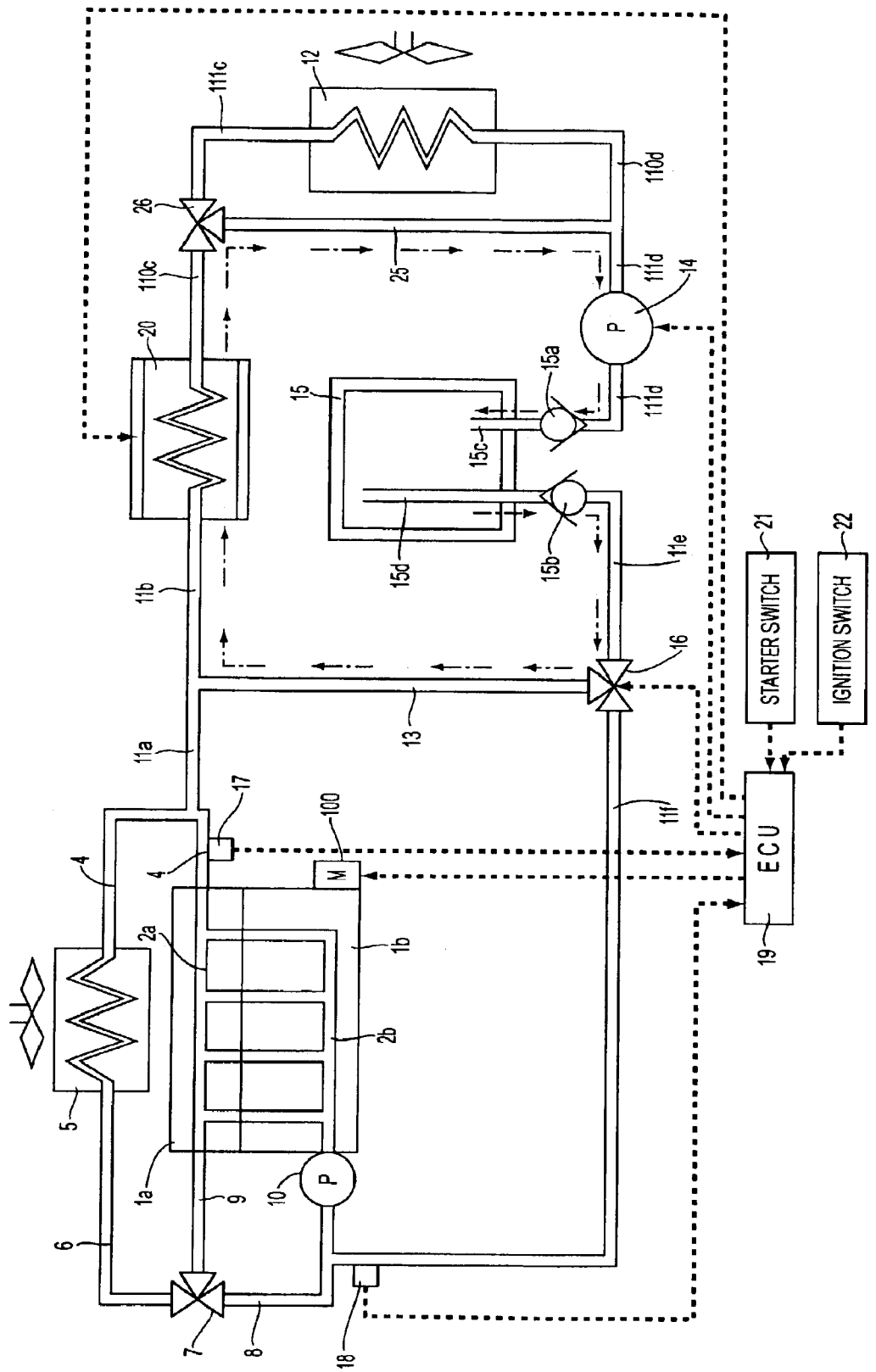
FIG. 6 is a diagram showing a configuration of the cooling water circulation system in a second embodiment of the internal combustion engine including the heat accumulation system according to the present invention.

FIG. 6 is a diagram schematically showing a configuration of the cooling system of the internal combustion engine including the heat accumulation system according to the present invention. A different point of the second embodiment from the first embodiment described above is that a point disposed midways of the third heater hose 11c is connected to a point disposed between the heater core 12 and the electrically-driven water pump 14 through a bypass 25 that bypasses the heater core 12.

Hereinafter, a bypass 13 for connecting the flow path switch valve 16 to a connecting point between the first heater hose 11a and the second heater hose 11b, is called a first bypass 13. The bypass 25 for connecting the third heater hose 11c to the fourth heater hose 11d is called a second bypass 25. A hose segment, extending from the connecting point with the second bypass 25 to the cooling water heating mechanism 20, of the third heater hose 11c, is referred to as a seventh heater hose 110c, and a hose segment thereof extending to the heater core 12 is called an eighth heater hose 111c. Further, a hose segment, extending from the connecting point with the second bypass 25 to the heater core 12, of the fourth heater hose 11d, is referred to as a ninth heater hose 10d, and a hose segment thereof extending to the heat accumulation container 15 is called a tenth heater hose 111d.

A flow path switch valve 26 is provided at the connecting point between the seventh heater hose 110c, the eighth heater hose 111c and the second bypass 25. This flow path switch valve 26 is a valve for switching the connection between the three passageways and the shut-off of any one of these three passageways, and is controlled by the ECU 19.

In the following discussion, the flow path switch 16 disposed at the connecting point between the first bypass 13, the fifth heater hose 11e and the sixth heater hose 11f, is called a first flow path switch valve 16, and the flow path switch valve 26 disposed at the connecting point between the second bypass 25, the seventh heater hose 110c and the eighth heater hose 111c, is called a second flow path switch valve 26.

In the thus configured cooling water circulation system, if there arises a necessity of supplying the high-temperature cooling water to the heat accumulation container 15 when stopping the operation of the internal combustion engine body 1, the ECU 19 control the second flow path switch valve 26 in order to shut off the eighth heater hose 111c and to connect the seventh heater hose 110c and the second bypass 25 with each other. The ECU 19 also controls the first flow path switch valve 16 in order to shut off the sixth heater hose 11f and to connect the fifth heater hose 11e and the first bypass 13 with each other, and further operates the cooling water heating mechanism 20 and the electrically-driven water pump 14.

In this case, as shown in FIG. 6, there is formed a circulation circuit in which to flow the cooling water in the sequence such as the electrically water pump 14→the tenth heater hose 111d→the heat accumulation container 15→the fifth heater hose 11e→the first flow path switch valve 16→the first bypass 13→the second heater hose 11b→the cooling water heating mechanism 20→the second flow path switch valve 26→the second bypass 25 the tenth heater hose 111d→the electrically-driven water pump 14.

In the circulation circuit given above, the high-temperature cooling water heated by the cooling water heating mechanism 20 is supplied to the heat accumulation container 15 via neither the internal combustion engine body 1 nor the heater core 12. Therefore, the unnecessary heat radiation from the high-temperature cooling water is prevented on the route extending from the cooling water heating mechanism 20 down to the heat accumulation container 15, and it does not happen that a flow resistance of the cooling water excessively increases.

As a result, there occurs neither a case where a flow quantity (flow rate) of the cooling water flowing into the heat accumulation container 15 per unit time unnecessarily decreases, nor a case where a quantity of the heat held by the cooling water per unit quantity unnecessarily decreases. It is therefore feasible to sufficiently ensure the quantity of the heat that can be accumulated in the heat accumulation container 15 per unit time.

Accordingly, the circulation circuit described above is, if there occurs the necessity of reserving the high-temperature cooling water in the heat accumulation container 15, capable of reserving the high-temperature cooling water in the heat accumulation container 15 in a short period of time even when the temperature of the cooling water is low.

Next, the switch of the car room interior heating system is OFF, for example, in the case of preheating the internal combustion engine body 1and reserving, in the heat accumulation container 15, the high-temperature cooling water discharged from the internal combustion engine body 1, the ECU 19 controls the first flow path switch valve 16 in order to shut off the first bypass 13 and to connect the fifth heater hose 11e and the sixth heater hose 11f with each other. The ECU 19 also controls the second flow path switch valve 26 in order to shut off the eighth heater hose 111c and to connect the seventh heater hose 110e and the second bypass 25 with each other.

Figure 7:
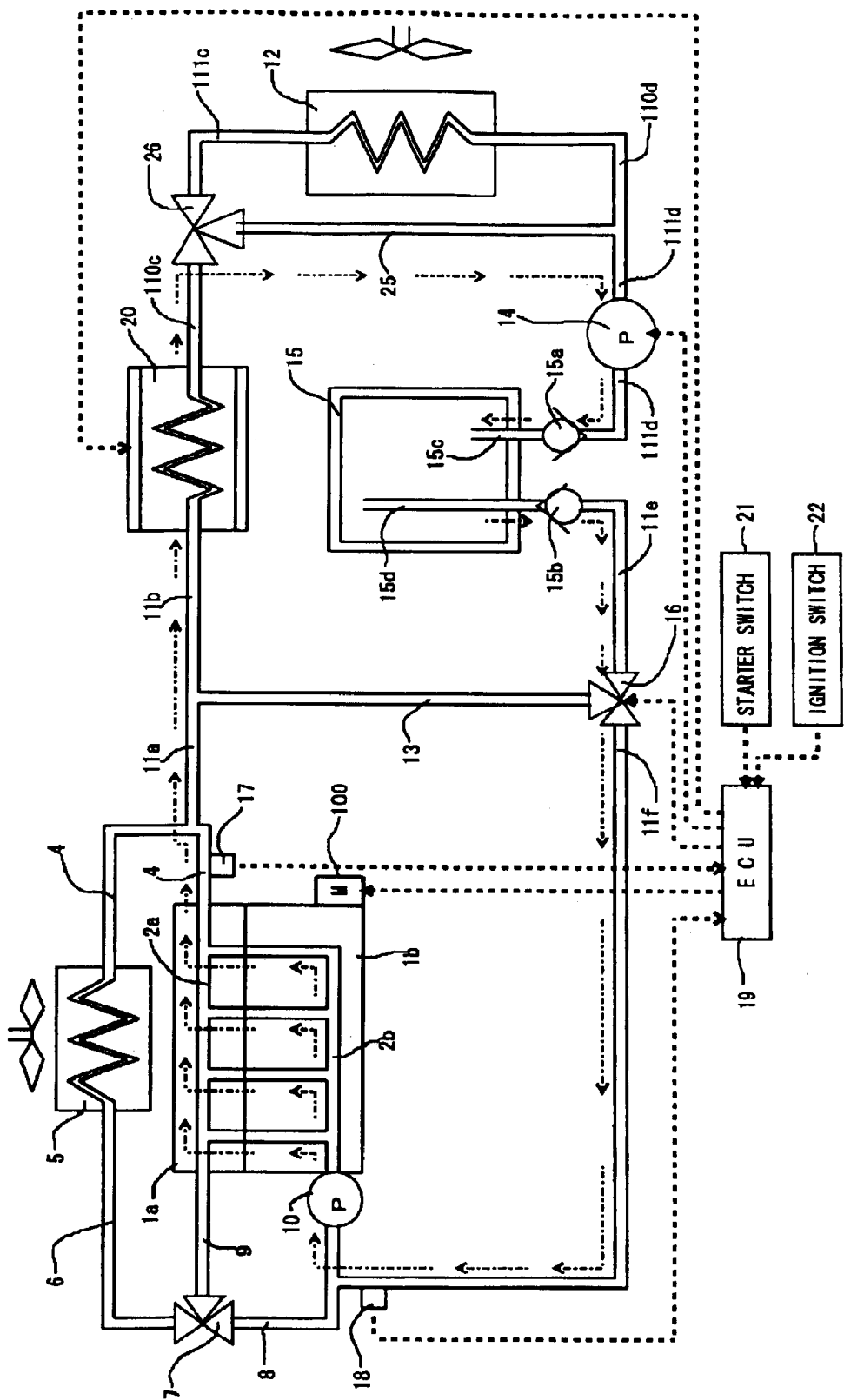
FIG. 7 is a diagram showing a flow of the cooling water through the engine head and block passageways in the second embodiment.

In this case, as shown in FIG. 7, there is formed a circulation circuit in which to flow the cooling water in the sequence such as the mechanical water pump 10→the block-sided cooling water passageway 2b→the head-sided cooling water passageway 2a→the first cooling water passageway 4→the first heater hose 11a→the second heater hose 11b→the cooling water heating mechanism 20→the seventh heater hose 110c→the second flow path switch valve 26→the second bypass 25→the tenth heater hose 111d the electrically-driven water pump 14 the tenth heater hose 111d→the heat accumulation container 15 the fifth heater hose 22e→the first flow path switch valve 16 the sixth heater hose 11f the third cooling water passageway 8→the mechanical water pump 10.

When the circulation circuit described above is configured, the cooling water the cooling water can circulate through the internal combustion engine body 1 and the heat accumulation container 15 without flowing via the heater core 12, thereby eliminating a possibility that the heat of the cooling water is unnecessarily radiated in the heater core 12. Further, the circulation circuit described above becomes smaller both in the flow quantity of the cooling water and in the flow resistance of the cooling water than in the circulation circuit via the heater 12. Therefore, loads on the electrically-driven water pump 14 and on the mechanical water pump 10 are reduced, whereby a quantity of fuel consumption and an electric power consumption can be also decreased.

<Third Embodiment>

Next, a third embodiment of the internal combustion engine including the heat accumulation system according to the present invention, will be discussed with reference to FIGS. 8 through 14. Herein, the discussion will be focused on a different configuration from that in the first embodiment discussed above, and the repetitive explanation of the same construction is omitted.

Figure 8:
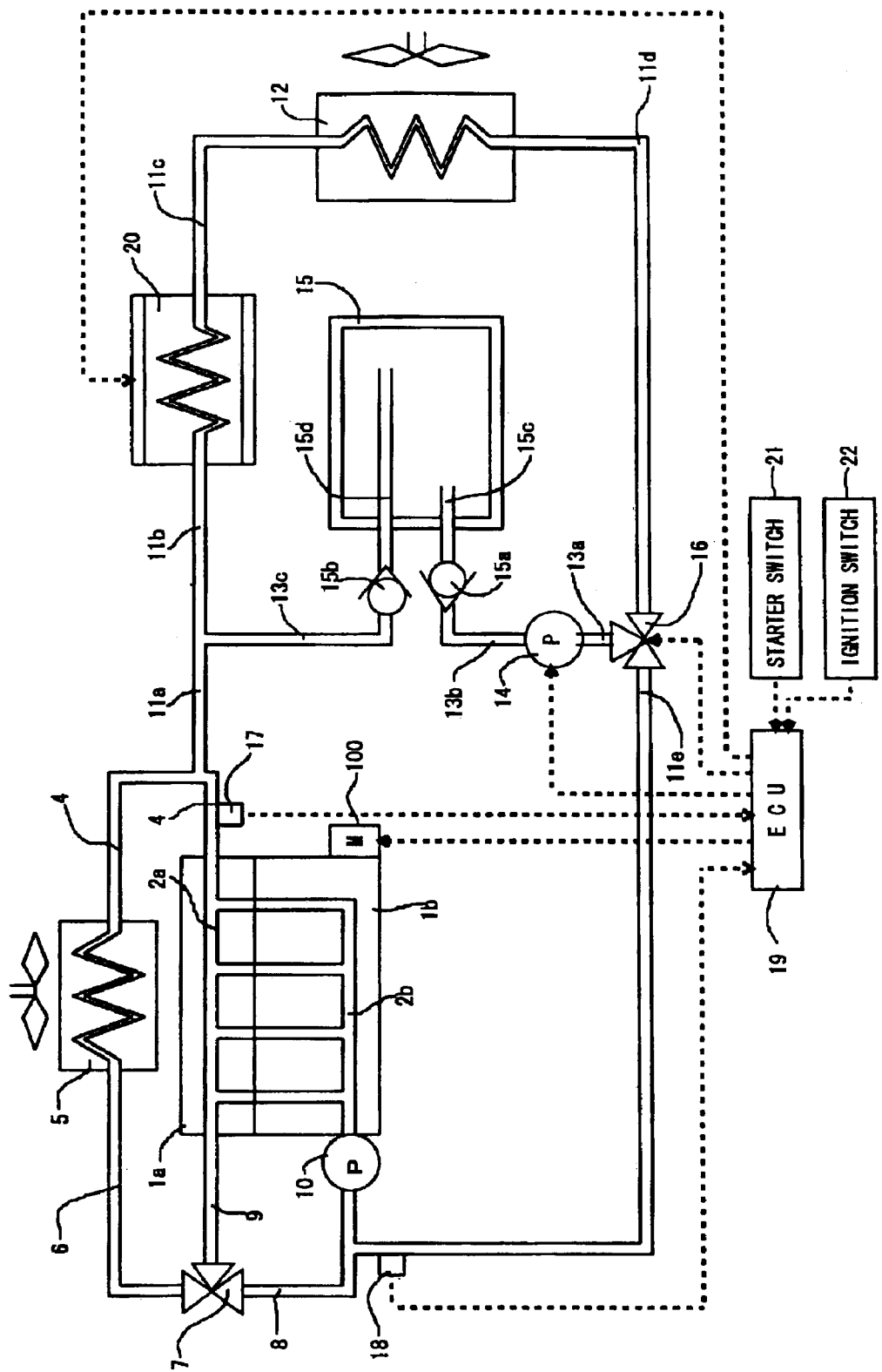
FIG. 8 is a diagram showing a configuration of the cooling water circulation system in a third embodiment of the internal combustion engine including the heat accumulation system according to the present invention.

FIG. 8 is a diagram schematically showing a configuration of the cooling system of the water cooled internal combustion engine in the third embodiment. A different point of the third embodiment from the first embodiment described above is that the electrically-driven water pump 14 and the heat accumulation container 15 are disposed midways of the bypass 13 in the third embodiment in contrast with a geometry in which the electrically-driven water pump 14 and the heat accumulation container 15 are disposed midways of the heater hose 11 in the first embodiment.

Referring to FIG. 8, the cooling water heating mechanism 20 ad the heater core 12 are disposed midways of the heater hose 11 in sequence from the proximal end of the heater hose 11.

A first bypass 13a is connected to a point, between the heater core 12 and the third cooling water passageway 8, of the heater hose 11, and further connected to a suction port of the electrically-driven water pump 14.

A second bypass 13b is connected to a discharge port of the electrically-driven water pump 14 and further connected to a cooling water inlet 15c of the heat accumulation container.

A third bypass 13c is connected to a cooling water outlet 15d of the heat accumulation container 15 and further connected to a point, between the first cooling water passageway 4 and the cooling water heating mechanism 20, of the heater hose 11.

In the following discussion, of the heater hose 11 extending between the first cooling water passageway 4 and the cooling water heating mechanism 20, a hose segment extending from the connecting point with the third bypass 13c up to the first cooling water passageway 4 is called the first heater hose 11a, and a hose segment extending from the same connecting point down to the cooling water heating mechanism 20 is referred to as the second heater hose 11b. A hose segment of the heater hose 11 that extends from the cooling water heating mechanism 20 down to the heater core 12, is called the third heater hose 11c. Further, of the heater hose 11 extending between the heater core 12 and the third cooling water passageway 8, a hose segment extending from the connecting point with the first bypass 13a to the heater core 12, is called a fourth heater hose 11d, and another hose segment extending from the same connecting point to the third cooling water passageway 8 is called the fifth heater hose 11e.

The flow path switch valve 16 is provided at the connecting point of the fourth heater hose 11d, the fifth heater hose 11e and the first bypass 13a. This flow path valve 16 may be defined as one mode of a shut-off mechanism according to the present invention as well as being a valve for switching the connection between the three passageways and the shut-off of any one of these three passageways. The flow path switch valve 16 is driven by an actuator constructed of, e.g., an unillustrated step motor., and the actuator is controlled by the ECU 19.

Given at first is an explanation of a case of preheating the internal combustion engine body 1 in advance of starting up the internal combustion engine body 1. Note that the high-temperature cooling water be, it is assumed, reserved beforehand in the heat accumulation container 15.

The ECU 19, before a start of cranking of the internal combustion engine body 1, for instance, when the ignition switch 22 is turned ON from an OFF-state, controls the flow path switch valve 16 to shut off the fourth heater hose 11d and to connect the fifth heater hose 11e and the first bypass 13a with each other, and supplies the electrically-driven water pump 14 with the drive electric power in order to operate the electrically-driven water pump 14.

Figure 9:
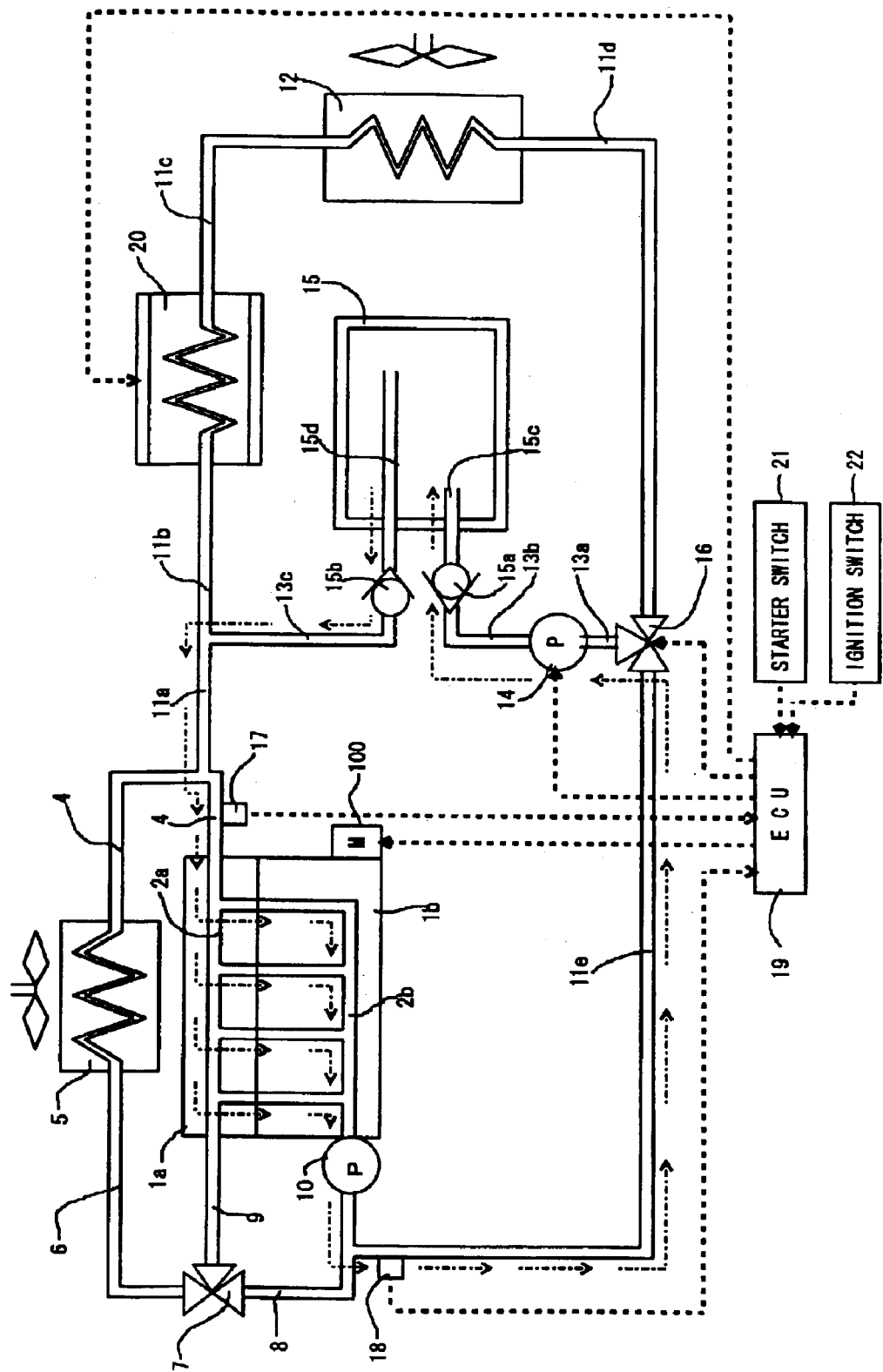
FIG. 9 is a diagram showing a flow of the cooling water when preheating the internal combustion engine body.

In this case, not the mechanical water pump 10 but the electrically-driven water pump 14 works, and hence, as shown in FIG. 9, there is formed a circulation circuit in which to flow the cooling water in the sequence such as the electrically water pump 14→the second bypass 13b→the heat accumulation container 15→the third bypass 13c→the first heater hose 11a→the first cooling water passageway 4→the head-sided cooling water passageway 2a→the block-sided cooing water passageway 2b→the mechanical water pump 10 the third cooling water passageway 8→the fifth heater hose 11e→the flow path switch valve 16→the first bypass 13a→the electrically-driven water pump 14. Namely, the circulation circuit in which the cooling water flows through only the electrically-driven water pump 14, the heat accumulation container 15 and the internal combustion engine body 1, is configured.

In this circulation circuit, the cooling water discharged from the electrically-driven water pump 14 flows into the heat accumulation container 15 via the second bypass 13b, and in place of this cooling water, the heat accumulation hot water reserved in the heat accumulation container 15 is discharged out of the heat accumulation container 15. The heat accumulation hot water discharged from the heat accumulation container 15 flows into the head-sided cooling water passageway 2a within the internal combustion engine body 1 via the third bypass 13c, the first heater hose 11a and the first cooling water passageway 4, and subsequently flows into the block-sided cooling water passageway 2b from the head-sided cooling water passageway 2a.

When the heat accumulation hot water discharged from the heat accumulation container 15 flows into the head-sided cooling water passageway 2a and the block-sided cooling water passageway 2b in the internal combustion engine body 1, in place of this hot water, the low-temperature cooling water staying previously in the head-sided cooling water passageway 2a and the block-sided cooling water passageway 2b, flows out to the third cooling water passageway 8 from the head-sided cooling water passageway 2a and the block-sided cooling water passageway 2b.

When the heat accumulation hot water thus flows into the internal combustion engine body 1, the heat of the heat accumulation hot water is transferred to wall surfaces of the head-sided cooling water passageway 2a and the block-sided cooling water passageway 2b, whereby the cylinder head 1a and the cylinder block 1b of the internal combustion engine body 1 are preheated.

In the circulation circuit described above, the heat accumulation hot water discharged from the heat accumulation container 15 arrives at the internal combustion engine body 1 without flowing via the heater core 12, and hence the heat of the heat accumulation hot water is not unnecessarily radiated in the heater core 12, and at the same time the flow resistance of the cooling water becomes lower than in the case of flowing via the heater core 12.

Accordingly, in the circulation circuit described above, the quantity of the heat accumulation hot water flowing into the internal combustion engine body 1 per unit time becomes larger and the quantity of the heat held by the heat accumulation hot water per unit quantity also becomes greater than in the case where the heat accumulation hot water flows via the heater core 12. Hence, there increases the quantity of the heat transferred to the internal combustion engine body 1 from the heat accumulation hot water per unit time, whereby the internal combustion engine body 1 is efficiently preheated in a short period of time.

Further, in the circulation circuit given above, the heat accumulation hot water discharged from the heat accumulation container 15 is supplied in the sequence such as the heat-sided cooling water passageway 2a→the block-sided cooling water passageway 2b, and it therefore follows that the cylinder head 1a is preferentially preheated. As a result, both of a temperature of the wall surface of an unillustrated intake port of the cylinder head 1a and an intake temperature rise. Therefore, when and after starting up the internal combustion engine body 1, the vaporization of the fuel is speeded up, and the temperature of the air/fuel mixture rises. This leads to a reduction in quantity of the fuel attached to the wall surface, the stabilization of the fuel, the improvement of the start-up property and the reduction in warm-up operation time.

Next, when the starter switch 21 is turned ON from the OFF-state, the ECU 19, after stopping the operation of the electrically-driven water pump 14, starts the cranking of the internal combustion engine body 1 by applying the drive electric power to the starter motor 100 and the unillustrated injection valve etc.

Upon a completion of the start-up of the internal combustion engine body 1, the mechanical water pump 10 is driven by the rotational torque of the crank shaft. Corresponding to this operation, the ECU 19 controls the flow path switch valve 16 in order to shut off the fourth heater hose 11d, and keeps the electrically-driven water pump 14 in the stopping state.

In this case, not the electrically-driven water pump 14 but only the mechanical water pump 10 works. If the temperature of the cooling water on this occasion is equal to or lower than the valve opening temperature $T_1$ of the thermostat valve 7, the thermostat valve 7 shuts off the second cooling water passageway 6 and simultaneously opens the fourth cooling water passageway 9. Hence, there is formed a circulation circuit in which to flow the cooling water in the sequence such as the mechanical water pump 10→the block-sided cooling water passageway 2b→the head-sided cooling water passageway 2a→the fourth cooling water passageway 9→the thermostat valve 7→the third cooling water passageway 8→the mechanical water pump 10.

By the way, if the electrically-driven water pump 14 comes to the stopping state and the flow path switch valve 16 shuts off the heater hose 11d, it can be considered to configure a circulation circuit in which to flow the cooling water in the sequence such as the mechanical water pump 10→the block-sided cooling water passageway 2b→the head-sided cooling water passageway 2a→the first cooling water passageway 4→the first heater hose 11a→the third bypass 13c→the heat accumulation container 15→the second bypass 13b→the electrically-driven water pump 14→the first bypass 13a→the flow path switch valve 16→the fifth heater hose 11e→the third cooling water passageway 8→the mechanical water pump 10. One-way valves 15a, 15b serving as a counterflow preventive mechanism according to the present invention are, however, provided at the cooling water inlet 15c and a cooling water outlet 15c of the heat accumulation container 15, and hence the cooling water does not circulate along the circulation circuit described above.

Figure 10:
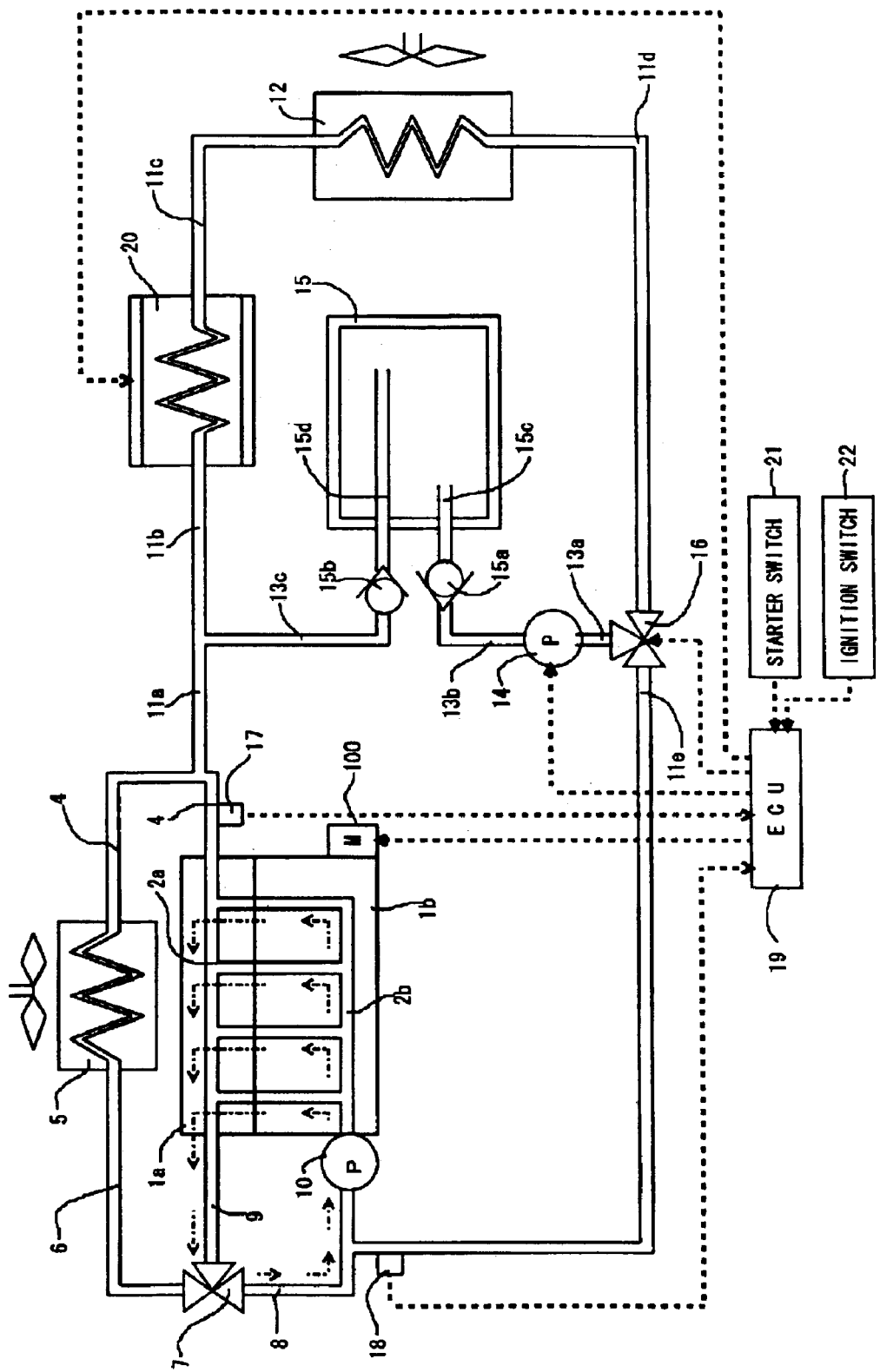
FIG. 10 is a diagram showing a flow of the cooling water when warming up the internal combustion engine body.

Accordingly, if the temperature of the cooling water is equal to or lower than the valve opening temperature $T_1$ of the thermostat valve 7 after the completion of the start-up of the internal combustion engine body 1, as shown in FIG. 10, there is formed only the circulation circuit in which to flow the cooling water in the sequence such as the mechanical water pump 10→the block-sided cooling water passageway 2b→the head-sided cooling water passageway 2a→the fourth cooling water passageway 9→the thermostat valve 7→the third cooling water passageway 8→the mechanical water pump 10.

In this circulation circuit, the comparatively-low-temperature cooling water coming out of the internal combustion engine body 1, flows in a way that bypasses the radiator 5, so that the heat of the cooling water is not unnecessarily radiated by the radiator 5. As a consequence, the internal combustion engine body 1 is not unnecessarily cooled by the cooling water, and the warm-up of the internal combustion engine body 1 is not hindered.

Figure 11:
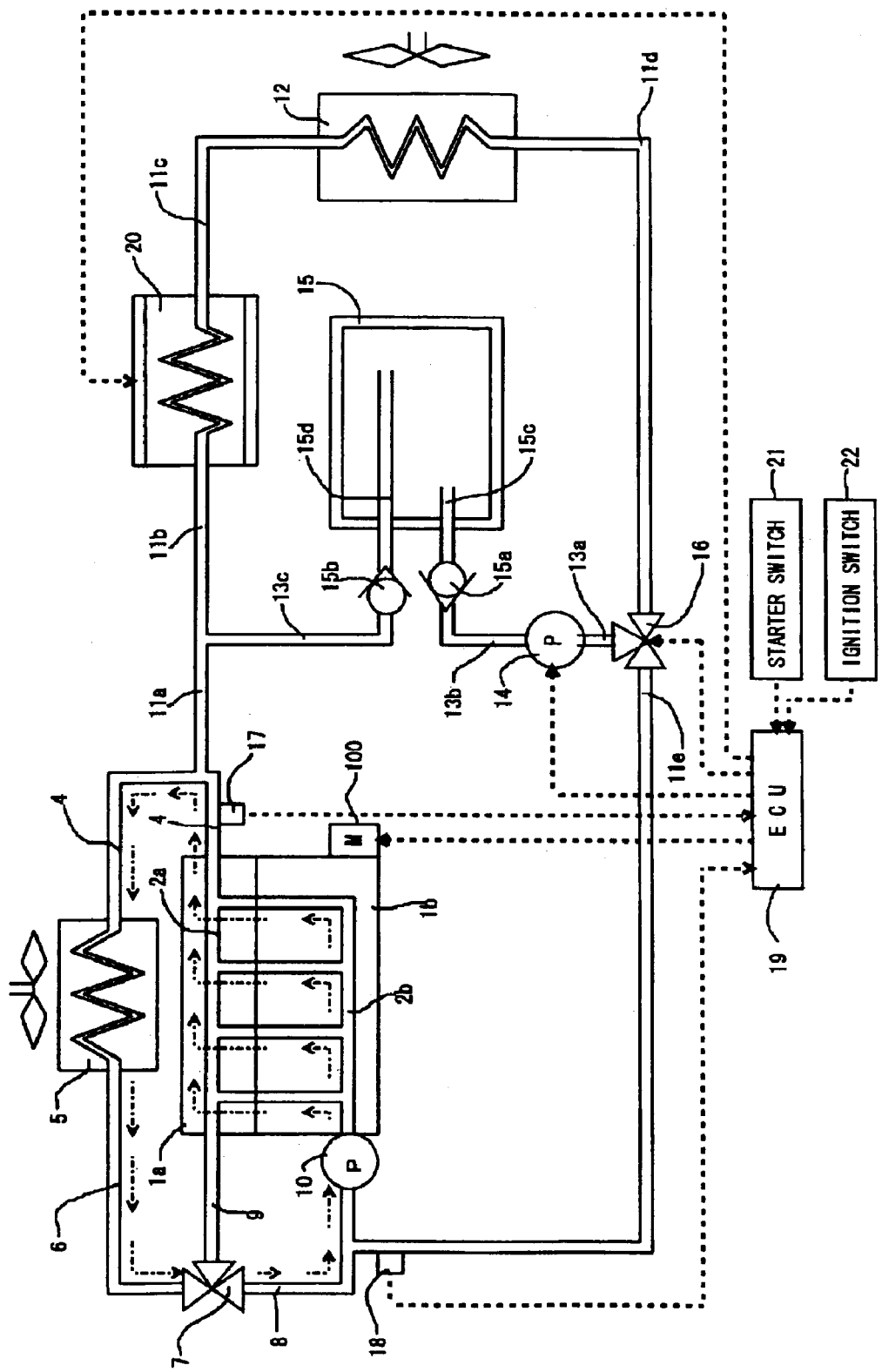
FIG. 11 is a diagram showing a flow of the cooling water when completing the warm-up of the internal combustion engine body.

Thereafter, if the temperature of the cooling water becomes higher than the valve open temperature $T_1$ of the thermostat valve 7 due to the heat evolved by the internal combustion engine body 1, the thermostat valve 7 opens the second cooling water passageway 6 and at the same time shuts off the fourth cooling water passageway 9. Hence, as shown in FIG. 11, there is formed a circulation circuit in which to flow the cooling water in the sequence such as the mechanical water pump 10→the block-sided cooling water passageway 2b→the head-sided cooling water passageway 2a→the first cooling water passageway 4→the radiator 5→the second cooling water passageway 6→thermostat valve 7→the third cooling water passageway 8→the mechanical water pump 10.

In this case, the cooling water exhibiting a comparatively high temperature, having flowed out of the internal combustion engine body 1, runs through the radiator 5, and therefore the heat of the cooling water is radiated by the radiator 5. As a consequence, the cooling water having the comparatively low temperature after its heat has been radiated by the radiator 5, flows into the internal combustion engine body 1, thereby cooling the internal combustion engine body 1 with this cooling water.

Next, if the switch of the unillustrated car room interior heating system is turned ON when the internal combustion engine body 1 is in its operation state, the ECU 19 controls the flow path switch valve 16 to shut off the first bypass 13a and to connect the fourth and fifth heater hoses 11d, 11e with each other, and keeps the electrically-driven water pump 14 in the stopping state.

Figure 12:
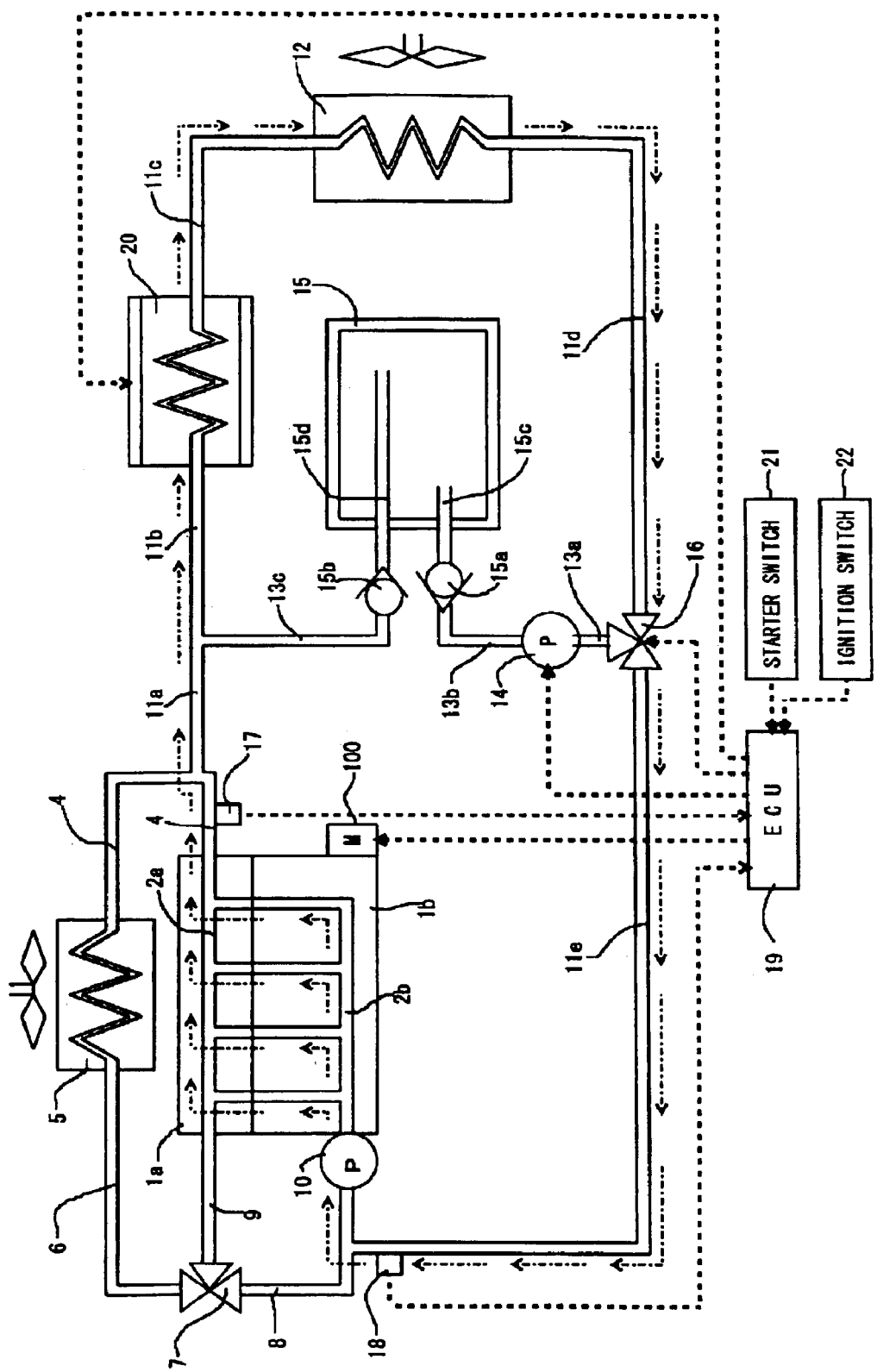
FIG. 12 is a diagram showing a flow of the cooling water in the case of operating the car room interior heating system when operating the internal combustion engine body.

In this case, only the mechanical water pump 10 comes to the operation state, and hence, as shown in FIG. 12, there is formed a circulation circuit in which to flow the cooling water in the sequence such as the mechanical water pump 10→the block-sided cooling water passageway 2b→the head-sided cooling water passageway 2a→the first cooling water passageway 4→the first heater hose 11a→the second heater hose 11b→the cooling water heating mechanism 20→the third heater hose 11c→the heater core 12→the fourth heater hose 11d the flow path switch valve 16→the fifth heater hose 11e→the third cooling water passageway 8→the mechanical water pump 10. Namely, the circulation circuit in which the cooling water flows through only the internal combustion engine body 1, the cooling water heating mechanism 20 and the heater core 12, is configured.

In this circulation circuit, the high-temperature cooling water flowing out of the internal combustion engine body 1 flows through the heater core 12, wherein the heat is exchanged between the cooling water and the air for heating the interior of the car room. That is, the heat of the cooling water is transferred to the air for heating the interior of the car room, thereby warming the air for heating the interior of the car room.

Moreover, in the circulation circuit described above, the high-temperature cooling water having flowed out of the internal combustion engine body 1 is supplied to the heater core 12 without flowing via the electrically-driven water pump 14 and the heat accumulation container 15. Therefore, the flow resistance of the cooling water does not excessively increase on the route extending from the internal combustion engine body 1 to the heater core 12.

As a consequence, the quantity of the cooling water flowing into the heater core 12 per unit time can be made larger than in the case where the cooling water having flowed out of the internal combustion engine body 1 flows via the electrically-driven water pump 14 and the heat accumulation container 15. Corresponding thereto, the quantity of the heat transferable to the air for heating the interior of the car room from the cooling water per unit time can be increased in the heater core 12.

Given next is an explanation of a case where the internal combustion engine body 1 in the third embodiment is mounted in a vehicle constructed to temporarily stop the operation of the internal combustion engine when the vehicle halts and so on.

The ECU 19, when the operation of the internal combustion engine body 1 is stopped in the ON-state of the switch of the car room interior heating system, judges whether or not an output signal value (a temperature of the cooling water) of the first water temperature sensor 17 and/or the second water temperature sensor 18 is higher than a predetermined temperature $T_2$.

The ECU 19, when judging that the temperature of the cooling water is higher than the predetermined temperature $T_2$, controls the flow path switch valve 16 in order to connect all of the fourth heater hose 11d, the fifth heater hose 11e and the first bypass 13a, and supplies the drive electric power to the electrically-driven water pump 14 to operate this water pump 14.

Figure 13:
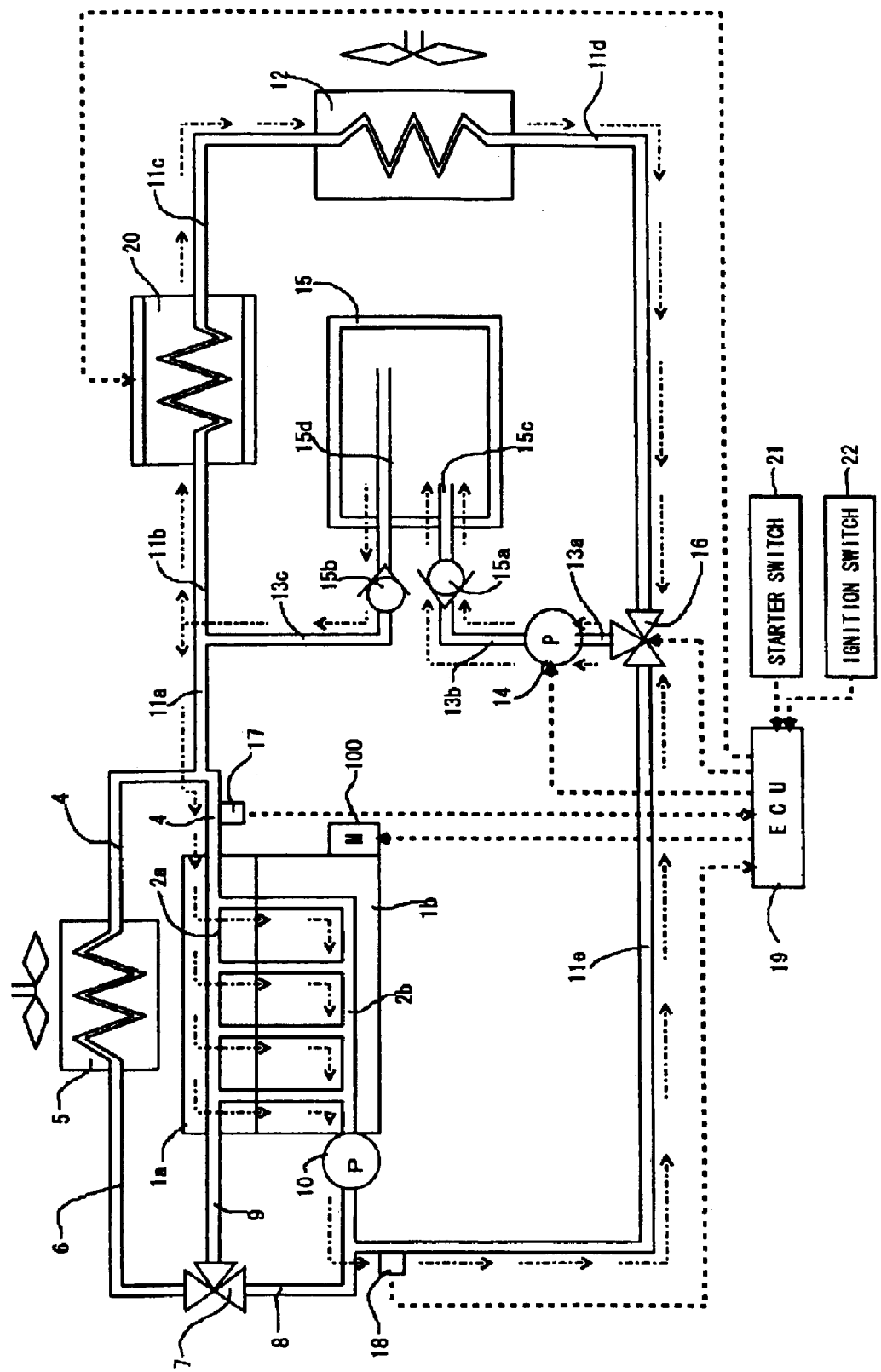
FIG. 13 is a diagram (1) showing a flow of the cooling water in the case of operating the car room interior heating system when stopping the operation of the internal combustion engine body.

In this case, not the mechanical water pump 10 but only the electrically-driven water pump 14 works, and hence, as shown in FIG. 13, there is formed a circulation circuit in which to flow the cooling water in the sequence such as the electrically water pump 14→the second bypass 13b→the heat accumulation container 15→the third bypass 13c→the first heater hose 11a→the first cooling water passageway 4→the head-sided cooling waster passageway 2a→the block-sided cooling water passageway 2b→the mechanical water pump 10→the third cooling water passageway 8→the fifth heater hose 11e the flow path switch valve 16→the first bypass 13c→the electrically-driven water pump 14. At the same time, there is formed a circulation circuit in which to flow the cooling water in the sequence such as the electrically water pump 14→the second bypass 13b→the heat accumulation container 15→the third bypass 13c→the second heater hose 11b→the cooling water heating mechanism 20→the third heater hose 11c→the heater core 12→the fourth heater hose 11d→the flow path switch valve 16→the first bypass 13c→the electrically-driven water pump 14.

When the two circulation circuits described above are configured, the high-temperature cooling water flowing out of the internal combustion engine body 1 and the heat accumulation hot water discharged from the heat accumulation container 15 are mixed and thus flow into the heater core 12.

As a result, even if the mechanical water pump 10 comes to the stopping state when the operation of the internal combustion engine body 1 is stopped, the high-temperature cooling water flows through the heater core 12, whereby the performance of the car room interior heating system does not decline.

On the other hand, when the operation of the internal combustion engine body 1 is stopped in the ON-state of the switch of the car room interior heating system, the ECU 19, if judging that the temperature of the cooling water is equal to or lower than the predetermined temperature $T_2$, controls the flow path switch valve 16 in order to shut off the fifth heater hose 11e and to connect the fourth heater hose 11d and the first bypass 13a with each other, and operates the electrically-driven water pump 14 and further the cooling water heating mechanism 20.

Figure 14:
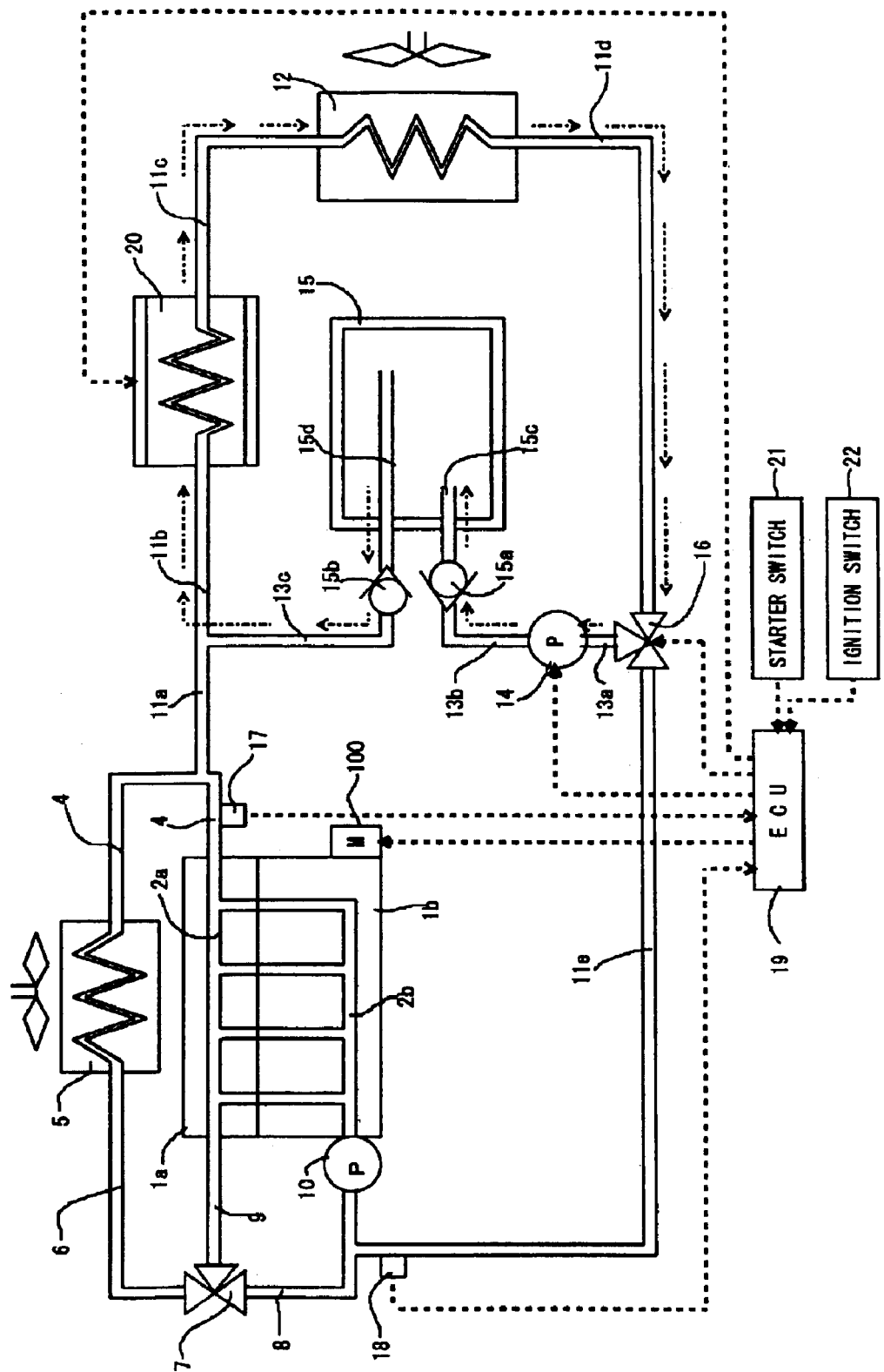
FIG. 14 is a diagram (2) showing a flow of the cooling water in the case of operating the car room interior heating system when stopping the operation of the internal combustion engine body.

In this case, not the mechanical water pump 10 but only the electrically-driven water pump 14 works, and hence, as shown in FIG. 14, there is formed a circulation circuit in which to flow the cooling water in the sequence such as the electrically water pump 14→the second bypass 13b→the heat accumulation container 15→the third bypass 13c→the second heater hose 11b→the cooling water heating mechanism 20→the third heater hose 11c→the heater core 12→the fourth heater hose 11d→the flow path switch valve 16→the first bypass 13a→the electrically-driven water pump 14.

In the circulation circuit described above, the cooling water discharged from the heat accumulation container 15, after being heated by the cooling water heating mechanism 20, flows into the heater core 12, and the heat of the cooling water is transferred to the air for heating the interior of the car room.

Accordingly, the circulation circuit given above is capable of ensuring a heat quantity needed for the heater core 12 to heat the air for heating the interior of the car room in a short period of time, even if the temperature of the cooling water reserved in the heat accumulation container 15 is low.

Next, a case of reserving the high-temperature cooling water in the heat accumulation container 15, will be described.

The ECU 19, when the internal combustion engine body 1 is in the operation stopping state, judges whether or not an output signal value (a temperature of the cooling water) of the first water temperature sensor 17 and/or the second water temperature sensor 18 is higher than a predetermined temperature $T_3$.

The ECU 19, when judging that the temperature of the cooling water is higher than the predetermined temperature $T_3$, controls the flow path switch valve 16 in order to shut off the fourth heater hose 11d and to connect the fifth heater hose 11e and the first bypass 13a with each other, and operates the electrically-driven water pump 14.

In this case, not the mechanical water pump 10 but only the electrically-driven water pump 14 works, and hence, as already explained referring to FIG. 9, there is formed the circulation circuit in which to flow the cooling water in the sequence such as the electrically water pump 14→the second bypass 13b→the heat accumulation container 15→the third bypass 13c→the first heater hose 11a→the first cooling water passageway 4→the head-sided cooling water passageway 2a→the block-sided cooing water passageway 2b→the mechanical water pump 10→the third cooling water passageway 8→the fifth heater hose 11e→the flow path switch valve 16→the first bypass 13a→the electrically-driven water pump 14.

In thus circulation circuit, when the cooling water-flows via the head-sided cooling water passageway 2a and the block-sided cooling water passageway 2b, the heat of the cylinder head 1a and the cylinder block 1b is transferred to the cooling water via the wall surfaces of the head-sided cooling water passageway 2a and the block-sided cooling water passageway 2b, so that the high-temperature cooling water flows out of the internal combustion engine body 1.

The high-temperature cooling water having flowed out of the internal combustion engine body 1 flows into the heat accumulation container 15 via the mechanical water pump 10, the third cooling water passageway 8, the fifth heater hose 11e, the flow path switch valve 16, the first bypass 13a, the electrically-driven water pump 14 and the second bypass 13b, and is reserved in the heat accumulation container 15.

The high-temperature cooling water having flowed from the internal combustion engine body 1 arrives at the heat accumulation container 15 without flowing via the heater core 12, thereby eliminating a possibility that the flow resistance of the cooling water on the route from the internal combustion engine body 1 to the heat accumulation container 15 unnecessarily increases, and preventing the unnecessary heat radiation from the high-temperature cooling water.

Consequently, neither the flow quantity of the cooling water flowing into the heat accumulation container 15 per unit time nor the quantity of the heat held by the cooling water per unit quantity, unnecessarily decreases. It is therefore feasible to sufficiently ensure the quantity of the heat that is accumulated in the heat accumulation container 15 per unit time.

On the other hand, in the case of reserving the high-temperature cooling water in the heat accumulation container 15, if the temperature of the cooling water is equal to or lower than the predetermined temperature $T_3$, the ECU 19 controls the flow path switch valve 16 in order to shut off the fifth heater hose 11e and to connect the fourth heater hose 11d and the first bypass 13a with each other, and operates the electrically-driven water pump 14 and further the cooling water heating mechanism 20.

In this case, not the mechanical water pump 10 but only the electrically-driven water pump 14 works, and hence, as already explained referring to FIG. 14, there is formed the circulation circuit in which to flow the cooling water in the sequence such as the electrically water pump 14→the second bypass 13b→the heat accumulation container 15 the third bypass 13c the second heater hose 11b→the cooling water heating mechanism 20→the third heater hose 11c→the heater core 12→the fourth heater hose 11d→the flow path switch valve 16→the first bypass 13a→the electrically-driven water pump 14.

In the circulation circuit described above, the high-temperature cooling heated by the cooling water heating mechanism 20 reaches the heat accumulation container 15 via the third heater hose 11c, the heater core 12, the fourth heater hose 11d, the flow path switch valve 16, the first bypass 13a, the electrically-driven water pump 14 and the second bypass 13b, and is reserved in the heat accumulation container 15.

On this occasion, the cooling water heated by the cooling water heating mechanism 20 arrives at the heat accumulation container 15 without flowing via the internal combustion engine body 1, thereby eliminating the possibility that the flow resistance of the cooling water on the route from the cooling water heating mechanism 20 to the heat accumulation container 15 unnecessarily increases, and preventing the unnecessary heat radiation from the high-temperature cooling water.

As a result, neither the flow quantity of the cooling water flowing into the heat accumulation container 15 per unit time nor the quantity of the heat held by the cooling water per unit quantity, unnecessarily decreases. It is therefore feasible to sufficiently ensure the quantity of the heat that is accumulated in the heat accumulation container 15 per unit time.

Note that if the cooling water heating mechanism 20 is not provided in the cooling water circulation system, the high-temperature cooling water flowing out of the internal combustion engine body 1 may be reserved in the heat accumulation container 15 by configuring the circulation circuit as describer in FIG. 9 immediately after stopping the operation of the internal combustion engine body 1.

In the internal combustion engine including the heat accumulation system according to the third embodiment discussed above, the electrically-driven water pump 14 and the heat accumulation container 15 are provided on the bypass 13 that bypasses the heater core 12 and therefore disposed in parallel with the heater core 12 in the flowing direction of the cooling water.

In this case, it is possible to configure a circulation circuit (1) in which the cooling water circulates through the internal combustion engine body 1, the heat accumulation container 15 and the electrically-driven water pump 14 without flowing via the heater core 12, a circulation circuit (2) in which the cooling water circulates through the internal combustion engine body 1, cooling water heating mechanism 20 and the heater core 12 without flowing via the electrically-driven water pump 14 and the heat accumulation container 15, and a circulation circuit (3) in which the cooling water circulates through the heat accumulation container 15, the electrically-driven water pump 14 and the cooling water heating mechanism 20 without flowing via the internal combustion engine body 1.

As a result, in the case of supplying the internal combustion engine body 1 with the heat accumulation hot water reserved in the heat accumulation container 15 or reserving, in the heat accumulation container 15 the high-temperature cooling water flowing out of the internal combustion engine body 1, the cooling water can reach the internal combustion engine body 1 or the heat accumulation container 15 without flowing via the heater core 12.

In the case of supplying the heater core 12 with the high-temperature cooling water flowing out of the internal combustion engine body 1, the cooling water flowing out of the internal combustion engine body 1 can arrive at the heater core 12 without flowing via the electrically-driven water pump 14 and the heat accumulation container 15.

In the case of supplying the heater core 12 with the heat accumulation hot water in the heat accumulation container 15, the heat accumulation hot water can arrive at the heater core 12 without flowing via the internal combustion engine body 1.

In the case of reserving, in the heat accumulation container 15, the cooling water heated by the cooling water heating mechanism 20 or supplying the heater core 12 with the cooling water heated by the cooling water heating mechanism 20, the cooling water heated by the cooling water heating mechanism 20 can reach the heat accumulation container 15 or the heater core 12 without flowing via the internal combustion engine body 1.

Therefore, according to the internal combustion engine including the heat accumulation system in the third embodiment, when supplying the cooling water to a desired portion, in other words, when supplying the heat held by the cooling water to the desired portion, it is feasible to minimize the number of members through which the cooling water flows on the route extending from the cooling water supply source to the destination of the water supply. This eliminates the possibility of the excessive rise in the flow resistance of the cooling water and enables the cooling water to be prevented from the unnecessary heat radiation. It is therefore possible to actualize the efficient preheating of the internal combustion engine and the improvement of the performance of the car room interior heating system.

Further, the cooling water circulation system in the third embodiment can be actualized with a simple structure, and hence the mountability on the vehicle does not decline.

<Fourth Embodiment>

Next, a fourth embodiment of the internal combustion engine including the heat accumulation system according to the present invention, will be discussed with reference to FIGS. 15 and 16. Herein, the discussion will be focused on a different configuration from that in the third embodiment discussed above, and the repetitive explanation of the same construction is omitted.

Figure 15:
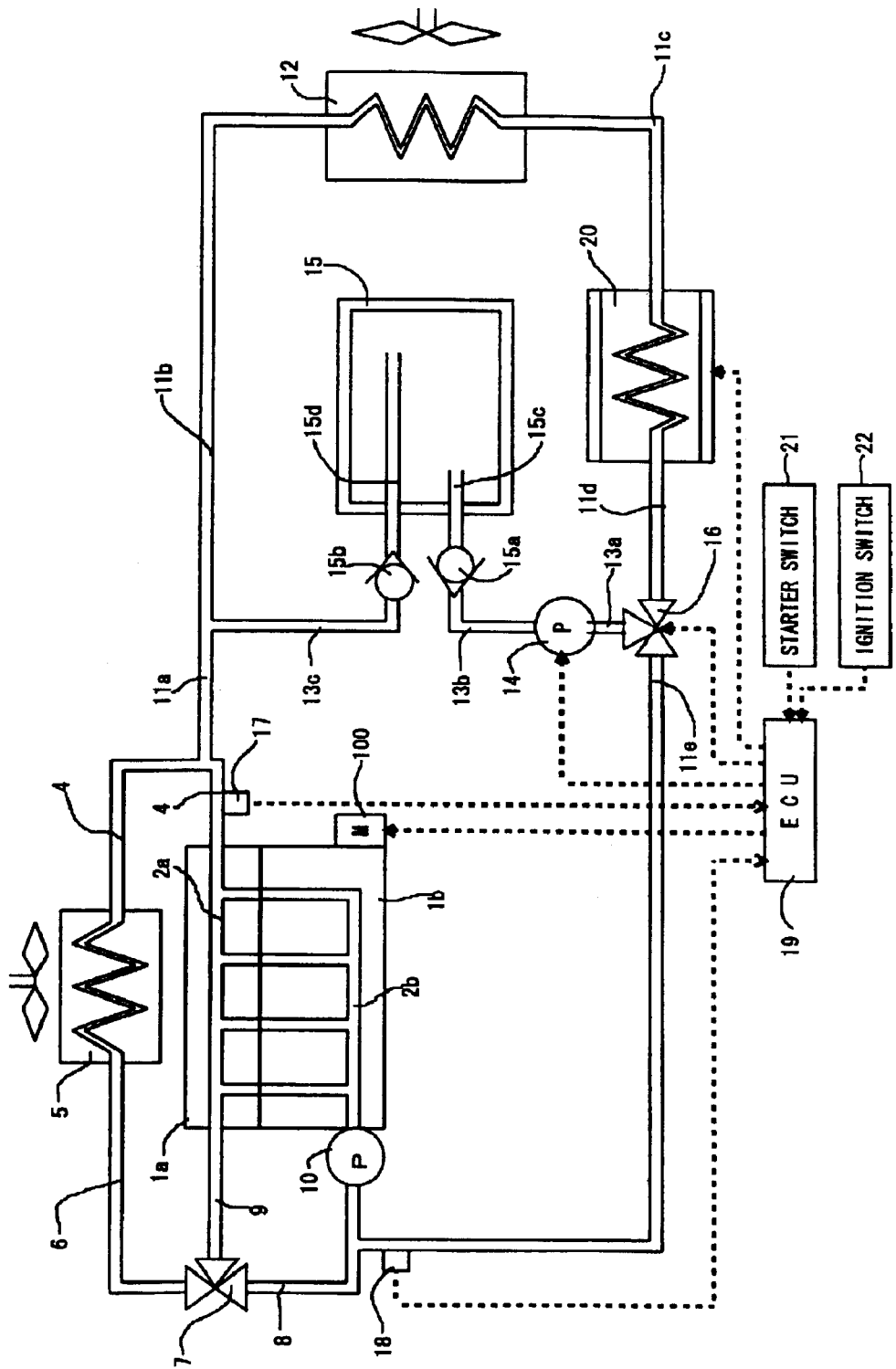
FIG. 15 is a diagram showing a configuration of the cooling water circulation system in a fourth embodiment of the internal combustion engine including the heat accumulation system according to the present invention.

FIG. 15 is a diagram schematically showing a configuration of the cooling system of the water cooled internal combustion engine, mounted in the vehicle, for driving the vehicle. A different point of the fourth embodiment from the third embodiment described above is that the cooling water heating mechanism 20 and the heater core 12 are replaced with each other in their positional relationship along the heater hose 11. To be specific, the cooling water heating mechanism 20 is disposed closer to the proximal end of the heater hose 11 than the heater core 12 in the third embodiment, and is disposed closer to the terminal of the heater hose 11 than the heater core 12 in the fourth embodiment.

In the following discussion, of the heater hose 11 extending between the first cooling water passageway 4 and the heater core 12, a hose segment extending from the connecting point with the third bypass 13a up to the first cooling water passageway 4 is called a first heater hose 11a, while a hose segment extending from the same connecting point down to the heater core 12 is referred to as a second heater hose 11b. A hose segment of the heater hose 11 that extends from the heater core 12 to the cooling water heating mechanism 20, is called a third heater hose 11c. A hose segment of the heater hose 11 that extends from the cooling water heating mechanism 20 down to the flow path switch valve 16, is called a fourth heater hose 11d. Further, a hose segment of the heater hose 11 that extends from the flow path switch valve 16 to the third cooling water passageway 8, is called a fifth heater hose 11e.

In the thus configured cooling water circulation system, in the case of reserving the high-temperature cooling water in the heat accumulation container 15, particularly when there arises a necessity of reserving the high-temperature cooling water in the heat accumulation container 15 under the condition that the output signal value (indicating the temperature of the cooling water) of the first water temperature sensor 17 and/or the second water temperature sensor 18 be equal to or lower than the predetermined temperature $T_3$, the ECU 19 controls the flow path switch valve 16 in order to shut off the fifth heater hose 11e and to connect the fourth heater hose 11d and the first bypass 13a with each other, and operates the electrically-driven water pump 14 and further the cooling water heating mechanism 20.

Figure 16:
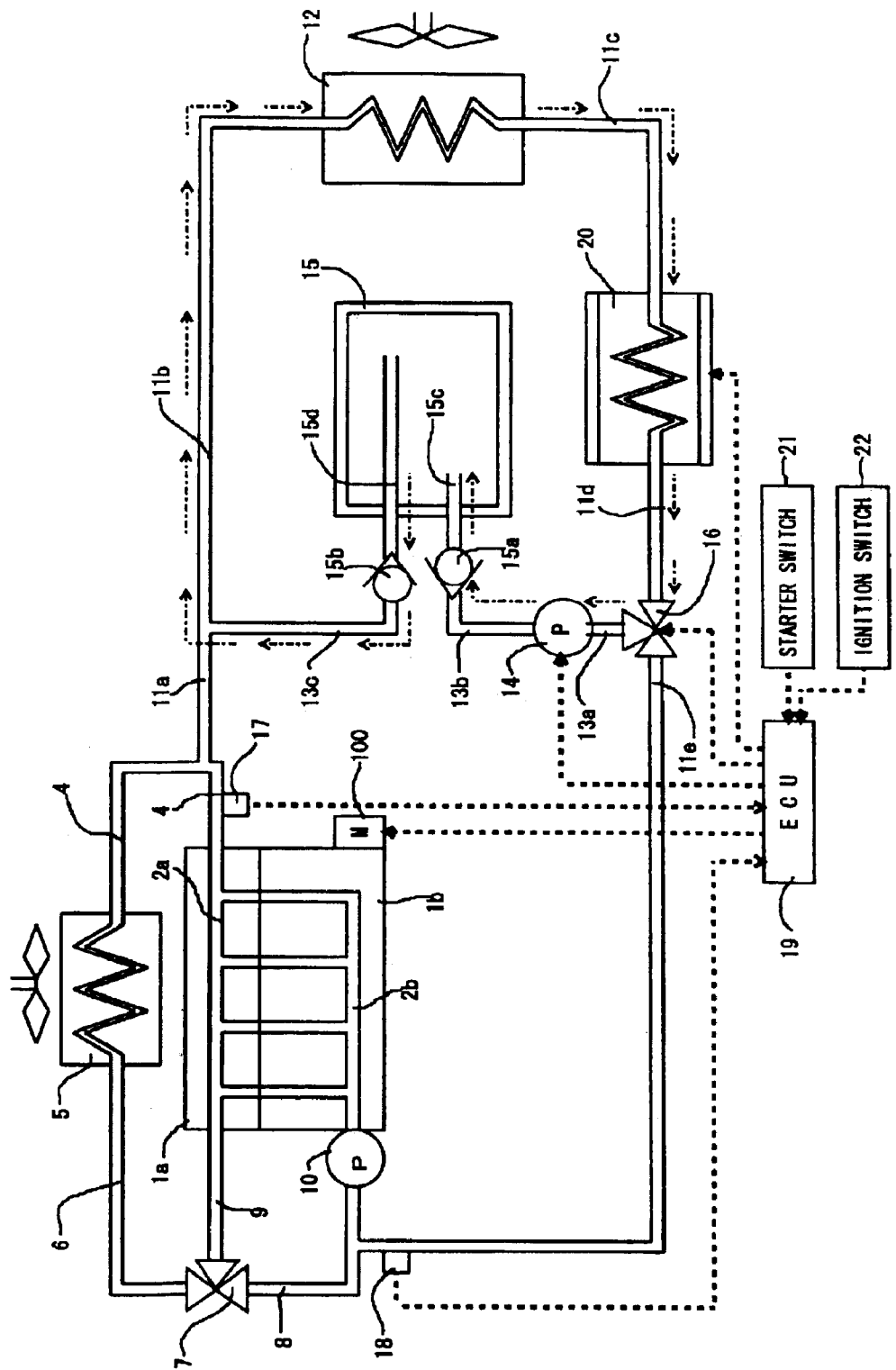
FIG. 16 is a diagram showing a flow of the cooling water when reserving the high-temperature cooling water in a heat accumulator.

In this case, with the operation of the electrically-driven water pump 14, as shown in FIG. 16, there is formed a circulation circuit in which to flow the cooling water in the sequence such as the electrically water pump 14→the second bypass 13b→the heat accumulation container 15→the third bypass 13c→the second heater hose 11b→the heater core 12→the third heater hose 11c→the cooling water heating mechanism 20→fourth heater hose 11d→the flow path switch valve 16→the first bypass 13a→the electrically-driven water pump 14.

When this circulation circuit is configured, the cooling water heated by the cooling water heating mechanism 20 arrives at the heat accumulation container 15 via the fourth heater hose 11d, the flow path switch valve 16, the electrically-driven water pump 14 and the second bypass 13b, and is reserved in the heat accumulation container 15.

On this occasion, the heater core 12 does not exist on the route extending from the cooling water heating mechanism 20 to the heat accumulation container 15, thereby eliminating such a possibility that the heat given to the cooling water from the cooling water heating mechanism 20 is released in the heater core 12. As a result, the heat given to the cooling water from the cooling water heating mechanism 20 is accumulated in the heat accumulation container 15 at a high efficiency.

Accordingly, according to the internal combustion engine including the heat accumulation system in the fourth embodiment, if there arises the necessity of reserving the high-temperature cooling water in the heat accumulation container 15, the high-temperature cooling water can be, even though the temperature of the cooling water is comparatively low, reserved in the heat accumulation container 15 in a short period of time.

<Fifth Embodiment>

Next, a fifth embodiment of the internal combustion engine including the heat accumulation system according to the present invention, will be discussed with reference to FIGS. 17 through 23. Herein, the discussion will be focused on a different configuration from that in the third embodiment discussed above, and the repetitive explanation of the same construction is omitted.

Figure 17:
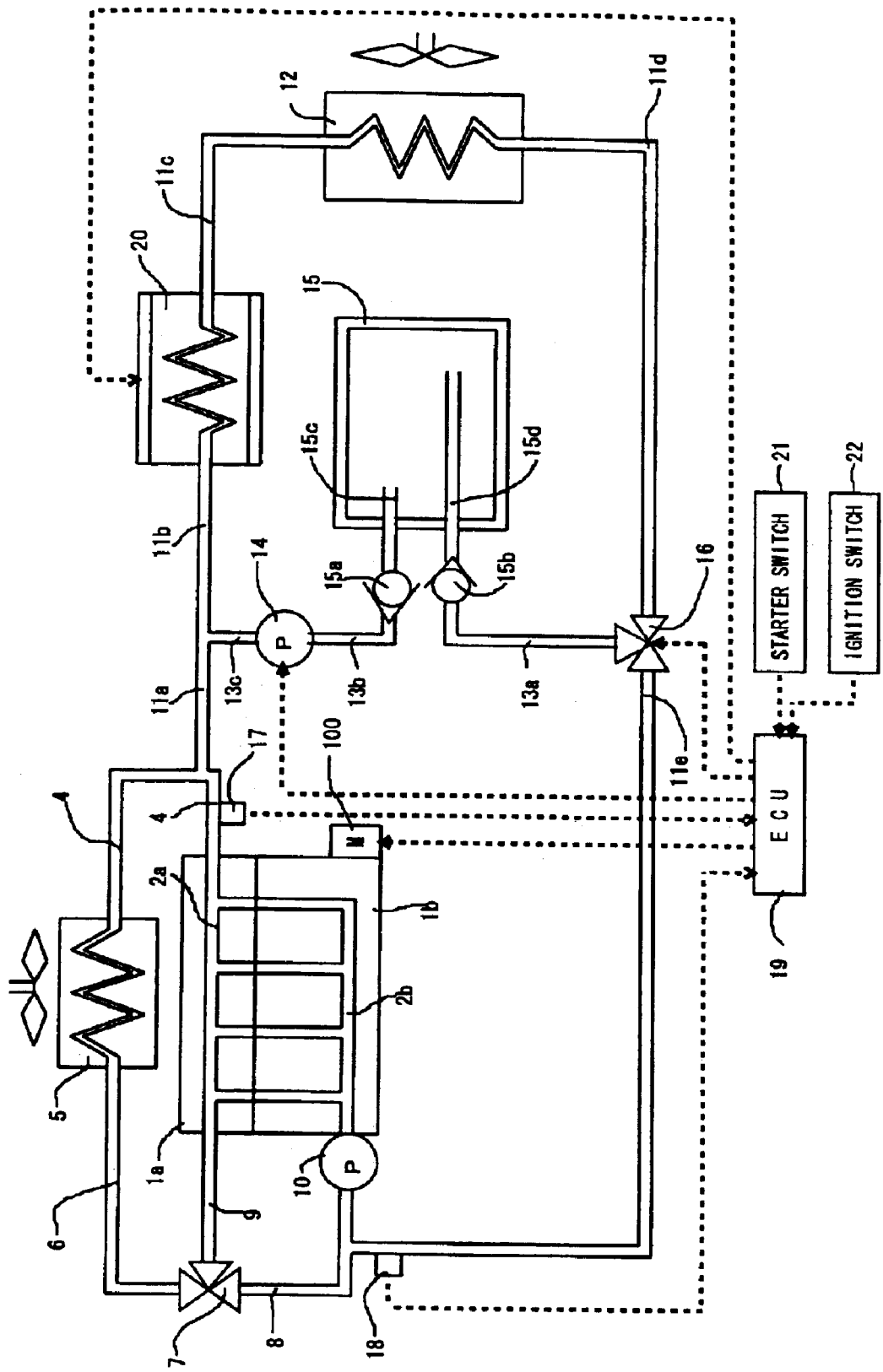
FIG. 17 is a diagram showing a configuration of the cooling water circulation system in a fifth embodiment of the internal combustion engine including the heat accumulation system according to the present invention.

FIG. 17 is a diagram schematically showing a configuration of the cooling system of the water cooled internal combustion engine for driving the vehicle. A different point of the fifth embodiment from the third embodiment described above is that the electrically-driven water pump 14 and the heat accumulation container 15 are replaced with each other in their dispositions along the bypass 13.

Referring to FIG. 17, the first bypass 13a connected to the flow path switch valve 16 is connected to the cooling water outlet 15d of the heat accumulation container 15. The second bypass 13b is connected to the cooling water inlet 15c of the heat accumulation container 15 and further connected to the discharge port of the electrically-driven water pump 14. The third bypass 13c is connected to the suction port of the electrically-driven water pump 14 and further connected to the connecting point between the first heater hose 11a and the second heater hose 11b.

In the thus configured cooling water circulation system, the flowing direction of the cooling water during the operation of the mechanical water pump 10 is the same as the flowing direction of the cooling water during the operation of the electrically-driven water pump 14.

Functions of the internal combustion engine including the heat accumulation system in the fifth embodiment will hereinafter be explained.

Given at first is an explanation of a case of preheating the internal combustion engine body 1 in advance of starting up the internal combustion engine body 1.

The ECU 19, before a start of cranking of the internal combustion engine body 1, controls the first flow path switch valve 16 to shut off the third heater hose 11c and to connect the first bypass 13a and the fourth heater hose 11d to each other, and the electrically-driven water pump 14.

Figure 18:
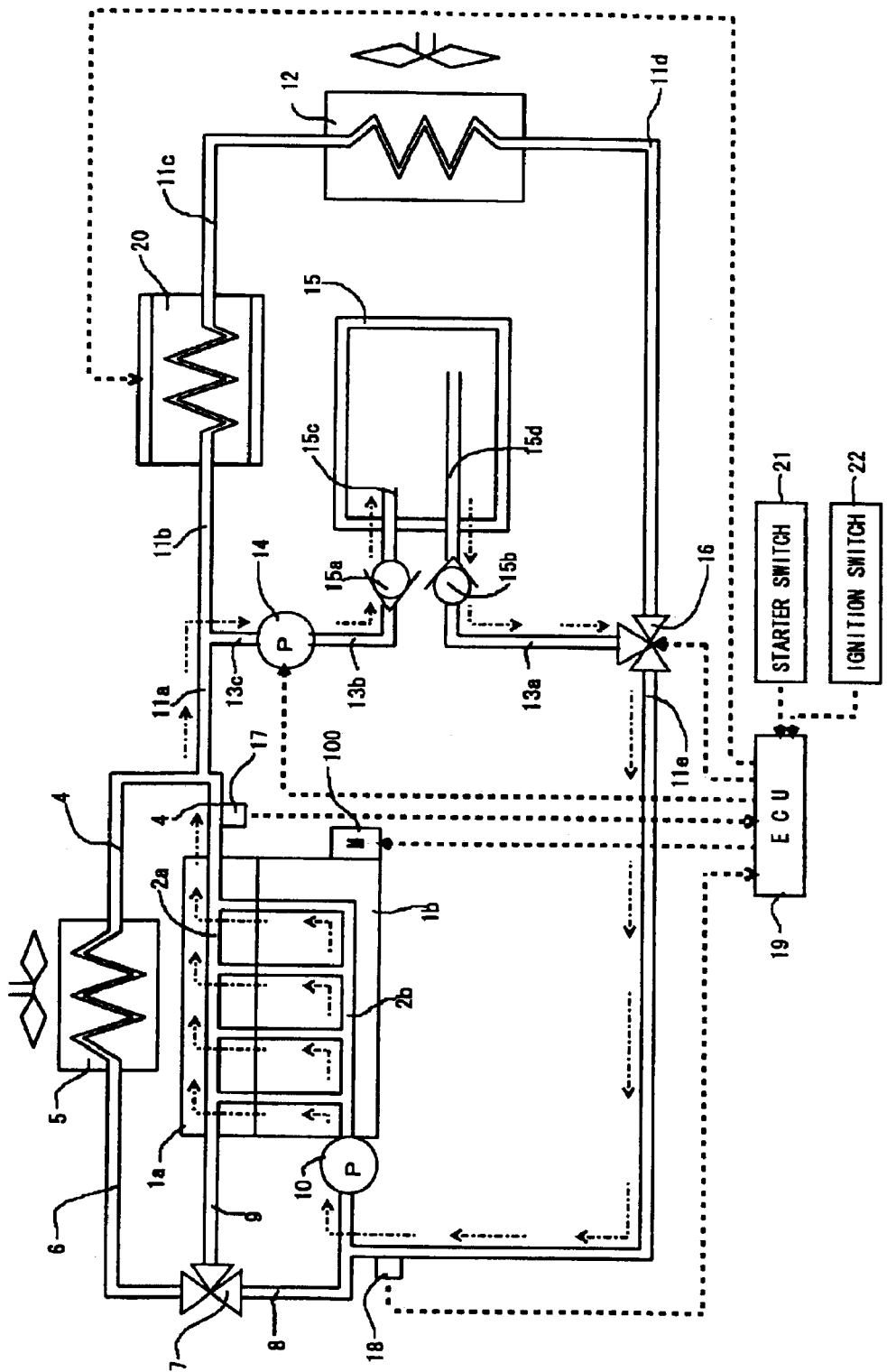
FIG. 18 is a diagram showing a flow of the cooling water when preheating the internal combustion engine body.

In this case, not the mechanical water pump 10 but only the electrically-driven water pump 14 works, and hence, as shown in FIG. 18, there is formed a circulation circuit in which to flow the cooling water in the sequence such as the electrically water pump 14→the second bypass 13b→the heat accumulation container 15→the first bypass 13a→the flow path switch valve 16→the fifth heater hose 11e→the third cooling water passageway 8→the mechanical water pump 10→the block-sided cooling, water passageway 2b→the head-sided cooling water passageway 2a the first cooling water passageway 4→the first heater hose 11a→the third bypass 13c→the electrically-driven water pump 14. The circulation circuit in which the cooling water flows via only the electrically-driven water pump 14, the heat accumulation container 15 and the internal combustion engine body 1.

In this circulation circuit, the cooling water discharged out of the electrically-driven water pump 14 flows into the heat accumulation container 15 via the second bypass 13b. In place of this cooling water, the heat accumulation hot water reserved in the heat accumulation container 15 is discharged out of the heat accumulation container 15.

The heat accumulation hot water discharged from the heat accumulation container 15 flows into the block-sided cooling water passageway 2b within the internal combustion engine body 1 via the first bypass 13a, the fifth heater hose 11e, the third cooling water passageway 8 and the mechanical water pump 10, and subsequently flows into the head-sided cooling water passageway 2a.

Thus, when the heat accumulation hot water reserved in the heat accumulation container 15 flows into the head-sided cooling water passageway 2a and the block-sided cooling water passageway 2b in the internal combustion engine body 1, in place of this hot water, the low-temperature cooling water staying previously in the head-sided cooling water passageway 2a and the block-sided cooling water passageway 2b, flows into the first cooling water passageway 4.

As a result, in the internal combustion engine body 1, the heat of the heat accumulation hot water is transferred to wall surfaces of the head-sided cooling water passageway 2a and the block-sided cooling water passageway 2b, whereby the cylinder head 1a and the cylinder block 1b of the internal combustion engine body 1 are preheated.

Further, in the circulation circuit, the heat accumulation hot water discharged from the heat accumulation container 15 arrives at the internal combustion engine body 1 without flowing via the heater core 12. Therefore, the unnecessary heat radiation from the high-temperature cooling water is prevented on the flow route extending from the heat accumulation container 15 to the internal combustion engine body 1, and it does not happen that the flow resistance of the cooling water excessively increases.

As a result, neither the flow quantity of the cooling water flowing into the internal combustion engine body 1 per unit time nor the quantity of the heat held by the cooling water per unit quantity unnecessarily decreases. It is therefore feasible to sufficiently ensure the quantity of the heat transferable to the internal combustion engine body 1 per unit time.

Next, when the starter switch 21 is turned ON from the OFF-state, the ECU 19, after stopping the operation of the electrically-driven water pump 14, starts the cranking of the internal combustion engine body 1 by applying the drive electric power to the starter motor 100 and the unillustrated injection valve etc., thereby starting up the internal combustion engine body 1.

Upon a completion of the start-up of the internal combustion engine body 1, the mechanical water pump 10 is driven by the rotational torque of the crank shaft. Corresponding to this operation, the ECU 19 controls the flow path switch valve 16 in order to shut off the fourth heater hose 11d, and keeps the electrically-driven water pump 14 in the stopping state.

Figure 19:
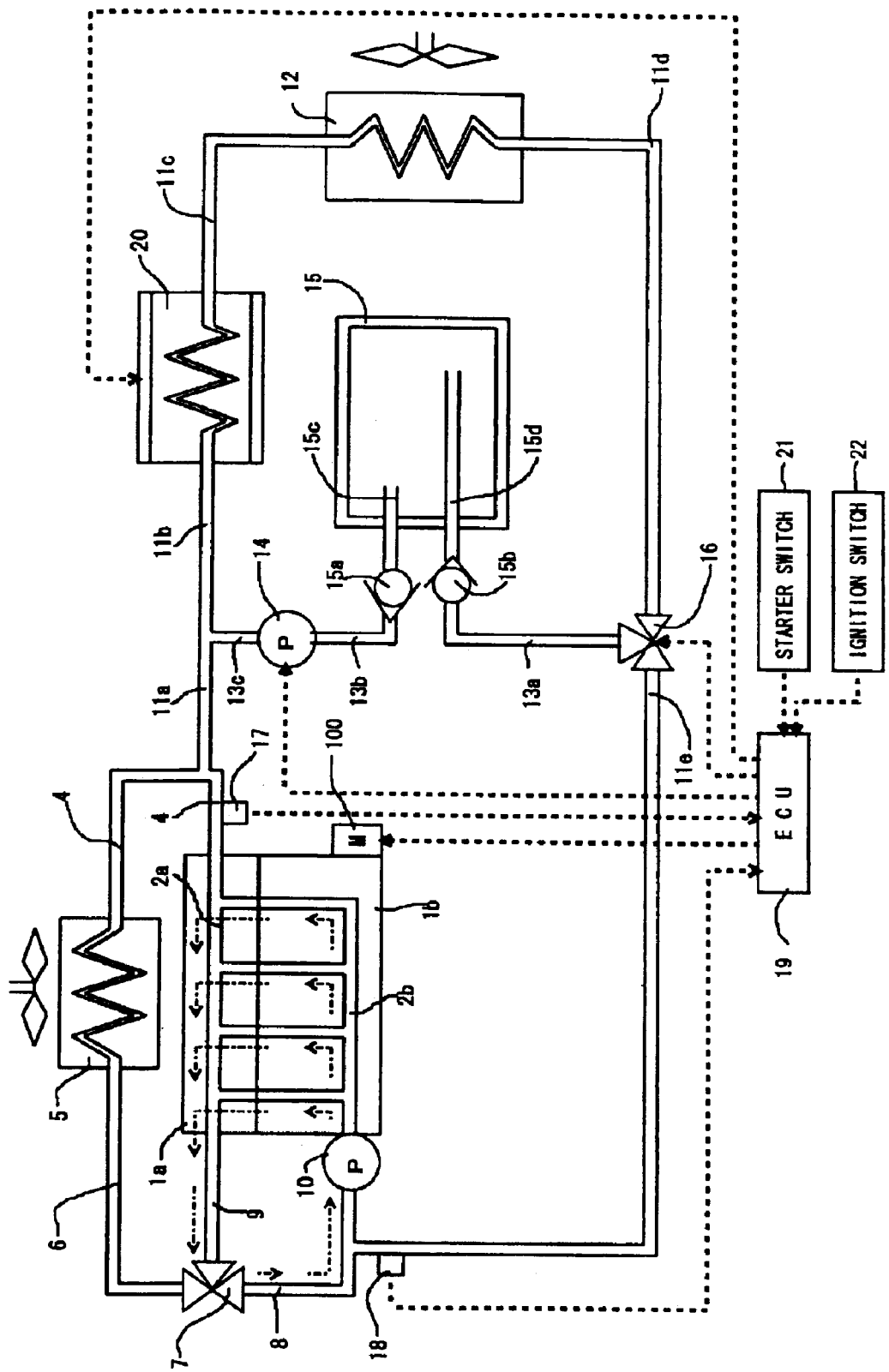
FIG. 19 is a diagram showing a flow of the cooling water when warming up the internal combustion engine body.

On this occasion, if the temperature of the cooling water is equal to or lower than the valve open temperature $T_1$ of the thermostat valve 7, the thermostat valve 7 shuts off the second cooling water passageway 6 and at the same time opens the fourth cooling water passageway 9. Hence, as shown in FIG. 19, there is formed the circulation circuit in which to flow the cooling water in the sequence such as the mechanical water pump 10→the block-sided cooling water passageway 2b→the head-sided cooling water passageway 2a→the fourth cooling water passageway 9→the thermostat valve 7→the third cooling water passageway 8→the mechanical water pump 10.

In this case, the cooling water exhibiting a comparatively low temperature, having flowed out of the internal combustion engine body 1 runs bypassing the radiator 5 and is not therefore cooled by the radiator 5 more than needed. As a result, the internal combustion engine body 1 is not unnecessarily cooled by the cooling water, and it does not happen that the warm-up of the internal combustion engine body 1 is hindered.

Figure 20:
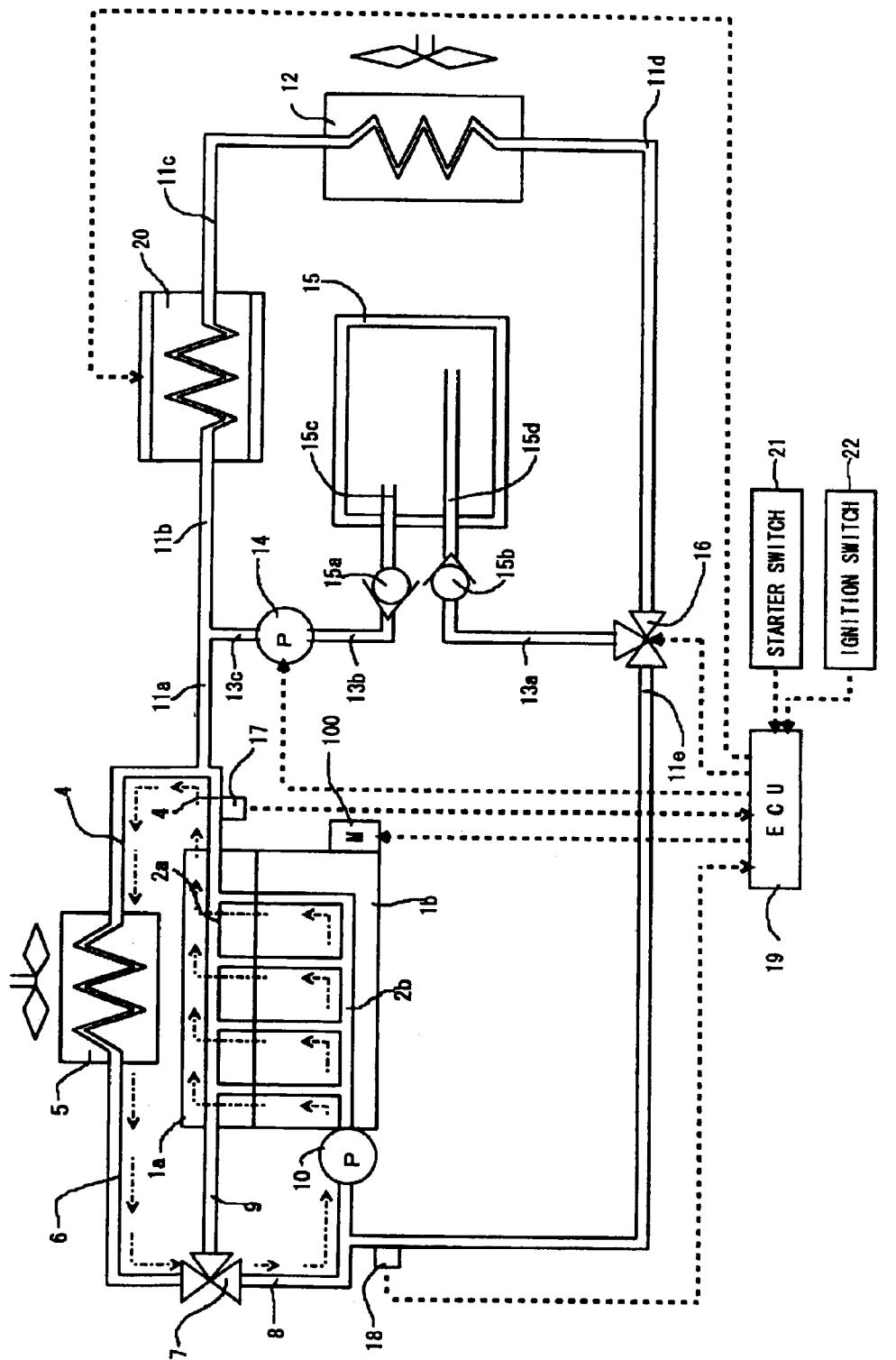
FIG. 20 is a diagram showing a flow of the cooling water when completing the warm-up of the internal combustion engine body.

Thereafter, if the temperature of the cooling water is equal to or higher than the valve open temperature $T_1$ of the thermostat valve 7, the thermostat valve 7 opens the second cooling water passageway 6 and at the same time shuts off the fourth cooling water passageway 9. Hence, as shown in FIG. 20, there is formed the circulation circuit in which to flow the cooling water in the sequence such as the mechanical water pump 10→the block-sided cooling water passageway 2b→the head-sided cooling water passageway 2a→the first cooling water passageway 4→the radiator 5→the second cooling water passageway 6→thermostat valve 7→the third cooling water passageway 8→the mechanical water pump 10.

In this case, the cooling water exhibiting a comparatively high temperature, having flowed out of the internal combustion engine body 1, runs through the radiator 5, and therefore the heat of the cooling water is radiated by the radiator 5. As a consequence, the cooling water having the comparatively low temperature after its heat has been radiated by the radiator 5, flows into the internal combustion engine body 1, thereby cooling the internal combustion engine body 1 with this cooling water.

Next, if the switch of the unillustrated car room interior heating system is turned ON when the internal combustion engine body 1 is in its operation state, the ECU 19 controls the flow path switch valve 16 to shut off the first bypass 13a and to connect the third and fourth heater hoses 11c, 11d with each other., and keeps the electrically-driven water pump 14 in the stopping state.

Figure 21:
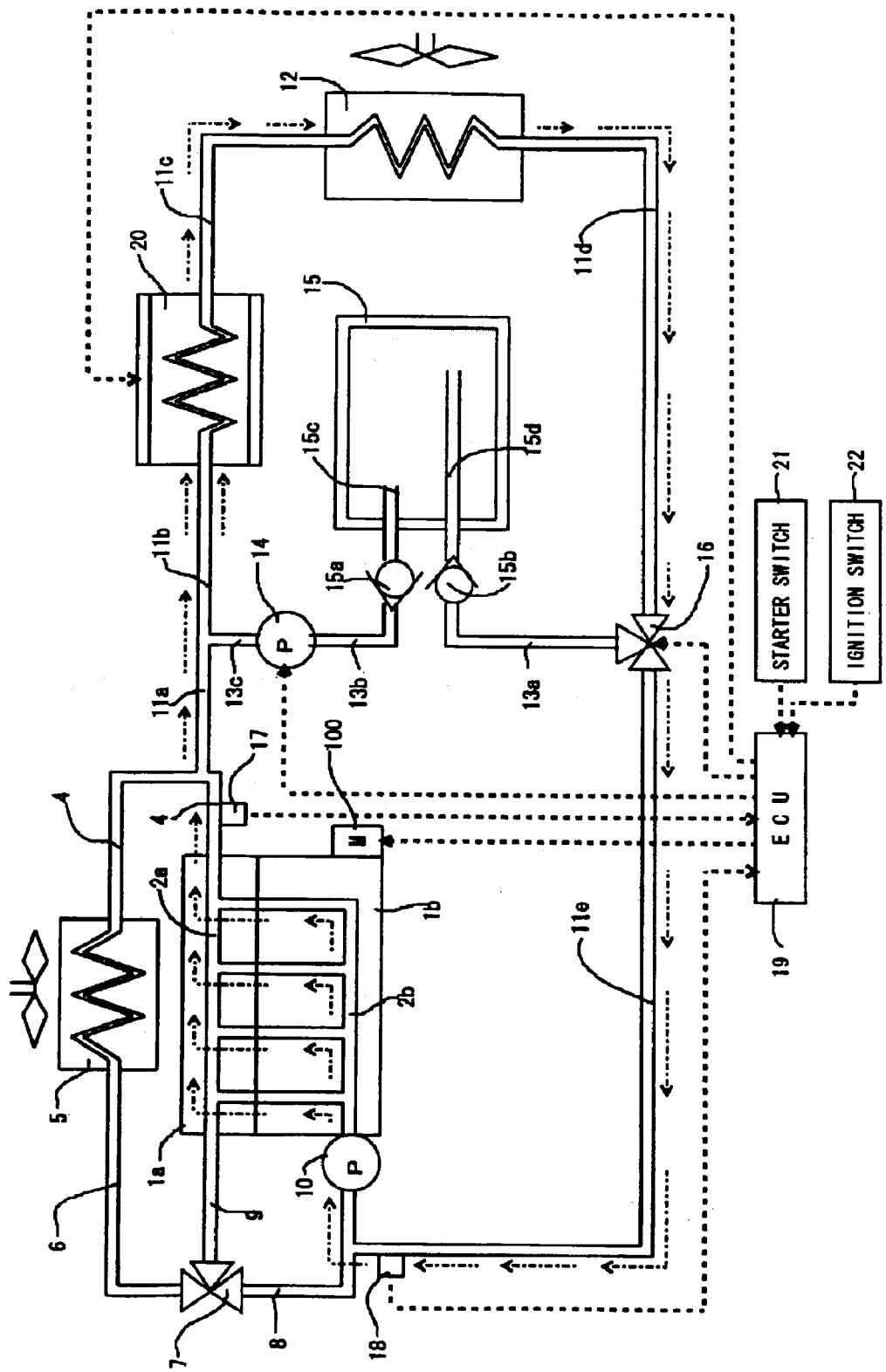
FIG. 21 is a diagram showing a flow of the cooling water in the case of operating the car room interior heating system when operating the internal combustion engine body.

In this case, not the electrically-driven water pump 14 but only the mechanical water pump 10 works, and hence, as shown in FIG. 21, there is formed the circulation circuit in which to flow the cooling water in the sequence such as the mechanical water pump 10→the block-sided cooling water passageway 2b→the head-sided cooling water passageway 2a→the first cooling water passageway 4→the first heater hose 11a→the second heater hose 11b→the cooling water heating mechanism 20→the third heater hose 11c→the heater core 12→the fourth heater hose 11d→the fifth heater hose 11e→the third cooling water passageway 8→the mechanical water pump 10. Namely, the circulation circuit in which the cooling water circulates through the internal combustion engine body 1 and the cooling water heating mechanism 20 without flowing via the heat accumulation container 15, is configured.

In this circulation circuit, the high-temperature cooling water having flowed out of the internal combustion engine body 1 runs through the heater core 12, and hence the heat is exchanged between the air for heating the interior of the car room and the cooling water in the heater core 12.

In the circulation circuit as shown in FIG. 21, the cooling water having flowed from the internal combustion engine body 1 arrives at the heater core 12 without flowing via the electrically-driven waster pump 14 and the heat accumulation container 15, thereby eliminating a possibility that the flow resistance of the cooling water excessively increases, and preventing the unnecessary heat radiation from the high-temperature cooling water.

Consequently, neither the flow quantity of the cooling water flowing into the heater core 12 per unit time nor the quantity of the heat held by the cooling water per unit quantity, unnecessarily decreases. It is therefore feasible to sufficiently ensure the quantity of the heat transferable to the air for heating the interior of the car room from the cooling water per unit time.

Note that if the output signal value (indicating the temperature of the cooling water flowing out of the internal combustion engine body 1) is equal to or lower than the predetermined temperature $T_2$ just when the circulation circuit as shown in FIG. 21 is configured, the ECU 19 may raise the temperature of the cooling water circulating along the circulation circuit described above by operating the cooling water heating mechanism 20.

The next discussion will be focused on a case where the internal combustion engine body 1 in the fifth embodiment is mounted on the vehicle constructed to temporarily stop the operation of the internal combustion engine when the vehicle halts and so on.

For instance, the ECU 19, when the operation of the internal combustion engine body 1 is stopped in the ON-state of the switch of the car room interior heating system, judges whether or not the output signal value (indicating the temperature of the cooling water) of the first water temperature sensor 17 and/or the second water temperature sensor 18 is higher than the predetermined temperature $T_2$.

The ECU 19, when judging that the temperature of the cooling water is higher than the predetermined temperature $T_2$, controls the flow path switch valve 16 in order to connect all of the fourth heater hose 11d, the fifth heater hose 11e and the first bypass 13a, and operates the electrically-driven water pump 14.

In this case, not the mechanical water pump 10 but only the electrically-driven water pump 14 works, and hence, as shown in FIG. 22, there is formed a circulation circuit in which to flow the cooling water in the sequence such as the electrically water pump 14→the second bypass 13b→the heat accumulation container 15→the first bypass 13a→the flowpath switch valve 16→the fifth heater hose 11e→the third cooling water passageway 8 the mechanical water pump 10 the block-sided cooling water passageway 2b→the head-sided cooling water passageway 2a→the first cooling water passageway 4→the first heater hose 11a the third bypass 13c→the electrically-driven water pump 14. At the same time, there is formed a circulation circuit in which to flow the cooling water in the sequence such as the electrically water pump 14→the second bypass 13b→the heat accumulation container 15→the first bypass 13a→the flow path switch valve 16→the fourth heater hose 11d→the heater core 12→the third heater hose 11c→the cooling water heating mechanism 20→the second heater hose 11b→the third bypass 13c→the electrically-driven water pump 14.

When the two circulation circuits described above are configured, the high-temperature cooling water flowing out of the internal combustion engine body i and the heat accumulation hot water discharged from the heat accumulation container 15 are mixed and thus flow into the heater core 12.

As a result, even if the mechanical water pump 10 comes to the stopping state when the operation of the internal combustion engine body 1 is stopped, the high-temperature cooling water flows through the heater core 12, whereby the performance of the car room interior heating system does not decline.

On the other hand, when the operation of the internal combustion engine body 1 is stopped in the ON-state of the switch of the car room interior heating system, the ECU 19, if judging that the temperature of the cooling water is equal to or lower than the predetermined temperature $T_2$, controls the flow path switch valve 16 in order to shut off the fifth heater hose 11e and to connect the fourth heater hose 11d and the first bypass 13a with each other, and operates the electrically-driven water pump 14 and further the cooling water heating mechanism 20.

Figure 23:
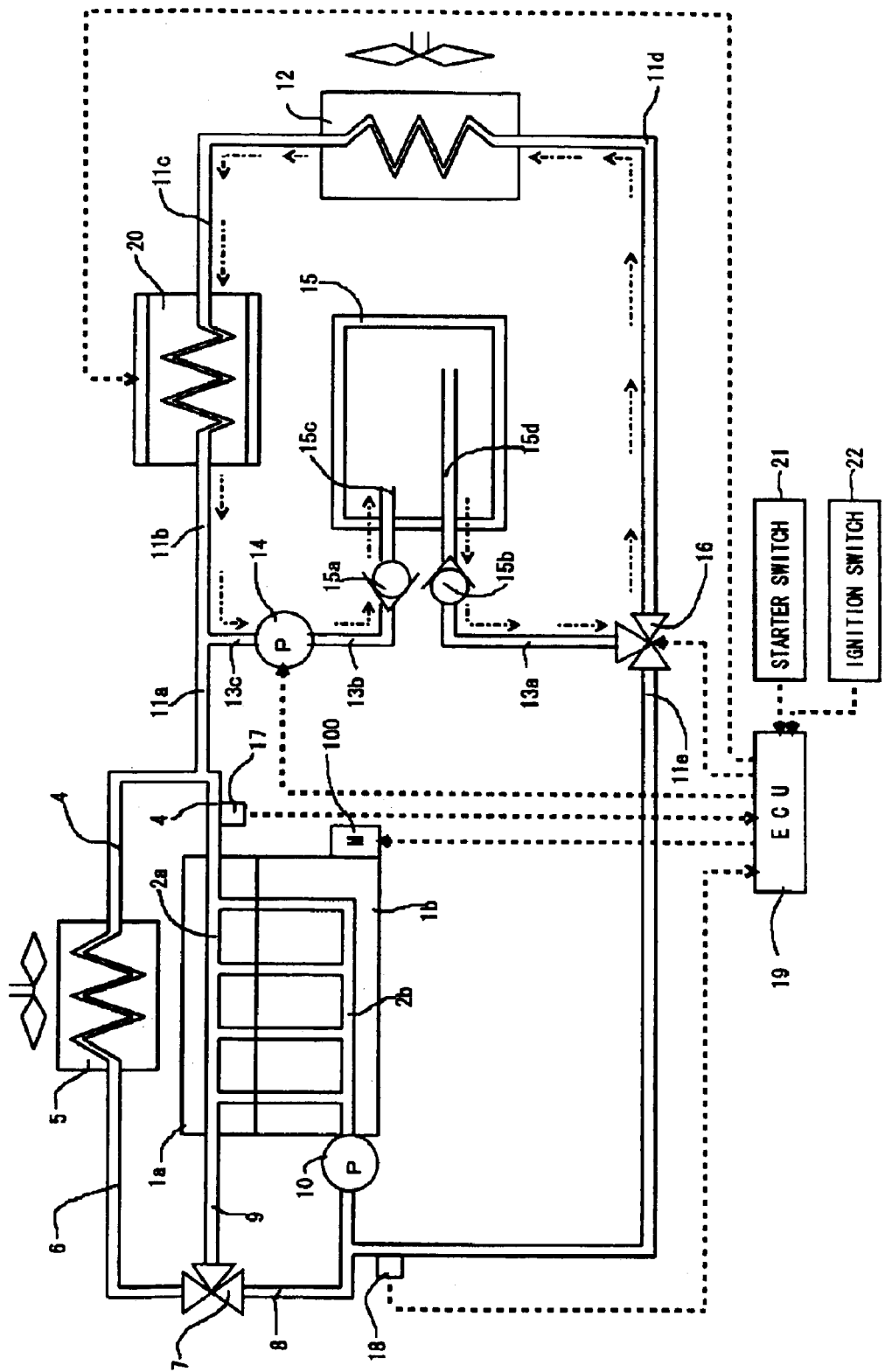
FIG. 23 is a diagram (2) showing a flow of the cooling water in the case of operating the car room interior heating system when stopping the operation of the internal combustion engine body.

In this case, not the mechanical water pump 10 but only the electrically-driven water pump 14 works, and hence, as shown in FIG. 23, there is formed a circulation circuit in which to flow the cooling water in the sequence such as the electrically water pump 14→the second bypass 13b→the heat accumulation container 15→the first bypass 13a→the flowpath switch valve 16→the fourth heater hose 11d→the heater core 12→the third heater hose 11c→the cooling water heating mechanism 20→the second heater hose 11b→the third bypass 13c—the electrically-driven water pump 14.

In the circulation circuit described above, the heat accumulation hot water discharged from the heat accumulation container 15 and the high-temperature cooling water heated by the cooling water heating mechanism 20 are mixed and thus flow into the heater core 12.

Accordingly, it is possible to ensure a heat quantity needed for the heater core 12 to heat the air for heating the interior of the car room in a short period of time, even if the temperature of the cooling water reserved in the heat accumulation container 15 is low. The performance of the car room interior heating system does not decline even when the operation of the internal combustion engine body 1 is stopped under a condition where the temperature of the cooling water is low.

Next, a case of reserving the high-temperature cooling water in the heat accumulation container 15, will be described.

The ECU 19, when the internal combustion engine body 1 is in the operation stopping state, judges whether or not the output signal value (indicating the temperature of the cooling water) of the first water temperature sensor 17 and/or the second water temperature sensor 18 is higher than the predetermined temperature $T_3$.

The ECU 19, when judging that the temperature of the cooling water is higher than the predetermined temperature $T_3$, establishes the same circulation circuit as the circulation circuit explained in FIG. 18, i.e., the circuit in which to flow the cooling water in the sequence such as the electrically water pump 14→the second bypass 13b→the heat accumulation container 15→the first bypass 13a→the flow path switch valve 16→the fifth heater hose 11e→the third cooling water passageway 8→the mechanical water pump 10→the block-sided cooling water passageway 2b→the head-sided cooling water passageway 2a→the first cooling water passageway 4→the first heater hose 11a→the third bypass 13c→the electrically-driven water pump 14.

In this circulation circuit, when the cooling water flows via the head-sided cooling water passageway 2a and the block-sided cooling water 2b, the heat of the cylinder hear 1a and the cylinder block 1b is transferred to the cooling water via the wall surfaces of the head-sided cooling water passageway 2a and the block-sided cooling water 2b, with the result that the high-temperature cooling water flows out of the internal combustion engine body 1.

The high-temperature cooling water flowing out of the internal combustion engine body 1 flows and into the heat accumulation container 15 via the first cooling water passageway 4→the first heater hose 11a→the third bypass 13c→the electrically-driven water pump 14→the second bypass 13b, and is reserved in this heat accumulation container 15.

Accordingly, the high-temperature cooling water flowing out of the internal combustion engine body 1 can arrive at the heat accumulation container 15 without flowing via the heater core 12 etc., thereby preventing the unnecessary heat radiation from the cooling water on the route extending from the internal combustion engine body 1 to the heat accumulation container. This leads to an efficient accumulation of the heat in the heat accumulation container 15, which has been transferred to the cooling water from the internal combustion engine body 1.

On the other hand, in the case of reserving the high-temperature cooling water in the heat accumulation container 15, if the temperature of the cooling water is equal to or lower than the predetermined temperature T3, the ECU 19 establishes the circulation circuit as the circuit shown in FIG. 23, in which to flow the cooling water in the sequence such as the electrically water pump 14 the second bypass 13b→the heat accumulation container 15→the first bypass 13a the flow path switch valve 16→the fourth heater hose 11d→the heater core 12→the third heater hose 11c→the cooling water heating mechanism 20→the fourth heater hose 11d→the third bypass 13c→the electrically-driven water pump 14, and then operates the cooling water heating mechanism 20.

In this circulation circuit described above, the high-temperature cooling water heated by the cooling water heating mechanism 20 reaches the heat accumulation container 15 via the second heater hose 11b, the third bypass 13c, the electrically-driven water pump 14 and the second bypass 13b.

On this occasion, the route from the cooling water heating mechanism 20 to the heat accumulation container 15 has no existences of the internal combustion engine body 1 and the heater core 12, so that the unnecessary heat radiation from the cooling water is prevented. Furthermore, in the circulation circuit described above, the cooling water does not flow through the internal combustion engine body 1, and hence it does not happen that the flow resistance of the cooling water excessively increases.

Consequently, neither the flow quantity of the cooling water flowing into the heat accumulation container 15 per unit time nor the quantity of the heat held by the cooling water per unit quantity, decreases. It is therefore feasible to sufficiently ensure the quantity of the heat that can be accumulated in the heat accumulation container 15 per unit time.

According to the internal combustion engine including the heat accumulation system described above, the electrically-driven water pump 14 and the heat accumulation container 15 are provided between the first bypass 13a and the third bypass 13d and therefore disposed in parallel with the heater core 12 in the flowing direction of the cooling water. It is therefore possible to selectively configure the circulation circuit in which the cooling water flows through only the internal combustion engine body 1, the heat accumulation container 14 and the electrically-driven water pump 15, and the circulation circuit in which the cooling water flows through only the internal combustion engine body 1, the cooling water heating mechanism 20 and the heater core 12.

As a consequence, in the case of supplying the internal combustion engine body 1 with the high-temperature cooling water in the heat accumulation container 15, the cooling water flowing out of the heat accumulation container 15 can arrive at the internal combustion engine body 1 without flowing via the heater core 12. In the case of supplying the heater core 12 with the high-temperature cooling water flowing from the internal combustion engine body 1, the cooling water flowing out of the internal combustion engine body 1 can arrive at the heater core 12 without flowing via the electrically-driven water pump 14 and the heat accumulation container 15.

Note that the flow path switch valve 16 is provided at the connecting point between the fourth heater hose 11d, the fifth heater hose 11e and the first bypass 13a in the cooling water circulation system in the fifth embodiment, and may also be provided at a connecting point between the first heater hose 11a, the second heater hose 11b and the third bypass 13c.

<Sixth Embodiment>

Next, a sixth embodiment of the internal combustion engine including the heat accumulation system according to the present invention, will be discussed with reference to FIG. 24. Herein, the discussion will be focused on a different configuration from that in the third embodiment discussed above, and the repetitive explanation of the same construction is omitted.

FIG. 24 is flowchart showing a preheating control routine executed by the ECU 19 when preheating the internal combustion engine body 1 in advance of starting up the internal combustion engine body 1. A different point of the sixth embodiment from the third embodiment is to stop the circulation of the cooling water and to inhibit the start-up of the internal combustion engine body 1 till the preheating of the internal combustion engine body 1 is completed when the head-sided cooling water passageway 2a and the block-sided cooling water passageway 2b of the internal combustion engine body 1 are filled with the heat accumulation hot water reserved in the heat accumulation container 15 on the occasion of preheating the internal combustion engine body 1, and when the low-temperature cooling water previously staying in the head-sided cooling water passageway 2a and the block-sided cooling water passageway 2b are discharged from the head-sided cooling water passageway 2a and the block-sided cooling water passageway 2b.

More specifically, the ECU 19, when the starter switch 21 is turned ON from the OFF-state, inhibits applying the drive electric power to the starter motor 100 and applying the drive electric power to a fuel injection valve, a spark plug etc provided for every cylinder of the internal combustion engine body 1, then controls the flow path switch valve 16 to shut off the fourth heater hose 11*d* and to connect the fifth heater hose 11*e* and the first bypass 13*a* to each other, and further operates the electrically-driven water pump 14.

In this case, not the mechanical water pump 10 but only the electrically-driven water pump 14 works, and hence, as discussed referring to FIG. 9 in the third embodiment, there is formed the circulation circuit in which to flow the cooling water in the sequence such as the electrically water pump 14→the second bypass 13*b*→the heat accumulation container 15→the third bypass 13*c*→the first heater hose 11*a*→the first cooling water passageway 4→the head-sided cooling water passageway 2*a*→the block-sided cooing water passageway 2*b*→the mechanical water pump 10→the third cooling water passageway 8→the fifth heater hose 11*e*→the flow path switch valve 16→the first bypass 13*a*→the electrically-driven water pump 14.

Note that some proportion of the cooling water flowing into the head-sided cooling water passageway 2*a* from the first cooling water passageway 4 in the circulation circuit given above, flows in the sequence such as the head-sided cooling water passageway 2*a*→the fourth cooling water passageway 9 the thermostat valve 7→the third cooling water passageway 8→the fifth heater hose 11*e*.

When these circulation circuits are configured, the cooling water discharged from the electrically-driven water pump 14 flows into the heat accumulation container 15 via the second bypass 13*b*, and, in place of this cooling water, the heat accumulation hot water reserved in the heat accumulation container 15 is discharged from the heat accumulation container 15.

The heat accumulation hot water discharged from the heat accumulation container 15 flows into the head-sided cooling water passageway 2*a* within the internal combustion engine body 1 via the third bypass 13*c*, the first heater hose 11*a* and the first cooling water passageway 4, and subsequently flows into the block-sided cooling water passageway 2*b*.

When the heat accumulation hot water thus flows into the head-sided cooling water passageway 2*a* and the block-sided cooling water passageway 2*b* of the internal combustion engine body 1, the low-temperature cooling water in place of this cooling water, which has been previously staying in the head-sided cooling water passageway 2*a* and the block-sided cooling water passageway 2*b*, is discharged into the third cooling water passageway 8.

As a result, in the internal combustion engine body 1, the heat of the heat accumulation hot water supplied from the heat accumulation container 15 is transferred to the wall surfaces of the head-sided cooling water passageway 2*a* and the block-sided cooling water passageway 2*b*, thereby preheating the internal combustion engine body 1.

By the way, if the cooling water continues to circulate even after the heat accumulation hot water supplied from the heat accumulation container 15 has flowed in spread inside the head-sided cooling water passageway 2*a* and the block-sided cooling water passageway 2*b* of the internal combustion engine body 1, it follows that the heat accumulation hot water having flowed into the head-sided cooling water passageway 2*a* and the block-sided cooling water passageway 2*b* flows out of the head-sided cooling water passageway 2*a* and the block-sided cooling water passageway 2*b*, and besides the low-temperature cooling water, which has once flowed out of the head-sided cooling water passageway 2*a* and the block-sided cooling water passageway 2*b*, flows again into the head-sided cooling water passageway 2*a* and the block-sided cooling water passageway 2*b*. If such a phenomenon occurs, the heat transferred to the internal combustion engine body 1 from the heat accumulation hot water is again absorbed by the cooling water, with the result that the preheating of the internal combustion engine body 1 is hindered.

By contrast, in the sixth embodiment, the head-sided cooling water passageway 2*a* and the block-sided cooling water passageway 2*b* are filled with the heat accumulation hot water reserved in the heat accumulation container 15, and, just when the low-temperature cooling water having stayed in the head-sided cooling water passageway 2*a* and the block-sided cooling water passageway 2*b* flows out of the head-sided cooling water passageway 2*a* and the block-sided cooling water passageway 2*b*, the ECU 19 stops the operation of the electrically-driven water pump 14.

The followings may be exemplified as methods of judging that the head-sided cooling water passageway 2*a* and the block-sided cooling water passageway 2*b* are filled with the heat accumulation hot water reserved in the heat accumulation container 15. A first method (1) is that a time (which will hereinafter be called a cooling water arrival time) till the heat accumulation hot water in the heat accumulation container 15 flows in spread through the whole of head-sided cooling water passageway 2*a* and of the block-sided cooling water passageway 2*b* since the operation of the electrically-driven water pump 14 has been started, is empirically obtained beforehand, and it is judged that the head-sided cooling water passageway 2*a* and the block-sided cooling water passageway 2*b* are filled with the heat accumulation hot water when an elapse time since the start of the operation of the electrically-driven water pump 14 becomes equal to or longer than the cooling water arrival time. A second method (2) is that the head-sided cooling water passageway 2*a* and the block-sided cooling water passageway 2*b* are, it is judged, filled with the heat accumulation hot water when an output signal value of the second water temperature sensor 18 provided downstream of the head-sided cooling water passageway 2*a* and the block-sided cooling water passageway 2*b* is equal to or higher than a predetermined temperature. A third method (3) is that the cylinder head 1*a* or the cylinder block 1*b* is fitted with a temperature sensor corresponding to a temperature of the cylinder head 1*a* or the cylinder block 1*b*, and it is judged that the head-sided cooling water passageway 2*a* and the block-sided cooling water passageway 2*b* are filled with the heat accumulation hot water when an output signal value of this temperature sensor becomes equal to or higher than a predetermined temperature.

When it is judged by one of these methods that the head-sided cooling water passageway 2*a* and the block-sided cooling water passageway 2*b* are filled with the heat accumulation hot water reserved in the heat accumulation container 15, the ECU 19 controls the flow path switch valve 16 in order to keep the fourth heater hose 11*d* in the shut-off state, and, after stopping the operation of the electrically-driven water pump 14, starts up the internal combustion engine body 1 by applying the drive electric power to the starter motor 100, the fuel injection valve and the spark plug.

In this case, the cranking of the internal combustion engine body 1 is started by operating the starter motor 100, and the mechanical water pump 10 operates corresponding to this cranking. Hence, as explained referring to FIG. 10 in the third embodiment discussed above, there is formed the circulation circuit in which to flow the cooling water in the sequence such as the mechanical water pump 10→the block-sided cooling water passageway 2b→the head-sided cooling water passageway 2a→the fourth cooling water passageway 9→the thermostat valve 7→the third cooling water passageway 8→the mechanical water pump 10. Namely, the circulation circuit in which the cooling water circulates through only the head-sided cooling water passageway 2a and the block-sided cooling water passageway 2b, is configured.

On this occasion, the head-sided cooling water passageway 2a and the block-sided cooling water passageway 2b are full of the heat accumulation hot water supplied from the heat accumulation container 15, and it therefore follows that only the heat accumulation hot water circulates through the head-sided cooling water passageway 2a and the block-sided cooling water passageway 2b and that the low-temperature cooling water does not flow into the head-sided cooling water passageway 2a and the block-sided cooling water passageway 2b.

As a result, the heat transferred to the internal combustion engine body 1 from the heat accumulation hot water is not absorbed by the low-temperature cooling water, and the preheating of the internal combustion engine body 1 is not hindered.

Note that the ECU 19 may perform the cranking of the internal combustion engine body 1 at several cycles by operating at first the starter motor 100 when starting up the internal combustion engine body 1, and may subsequently operate the fuel injection valve.

In this case, the fuel is injected after the cranking of the internal combustion engine body 1 has been performed at several cycles in a state where the fuel is not injected, and then the internal combustion engine body 1 is started up. When the cranking of the internal combustion engine body 1 is performed at several cycles in the state where the fuel is not injected, each cylinder of the internal combustion engine body 1 comes to have several compression strokes by only suction. As a result, the wall surface of the cylinder block 1b is heated by the heat evolved when the suction air is compressed, so that the heat of the suction air is not absorbed by the wall surface of the cylinder block 1b after starting the fuel injection.

Herein, the control of the preheating in the sixth embodiment will specifically be explained referring to FIG. 24.

FIG. 24 shows a preheating control routine. The ECU 19 executes this preheating control routine with such a trigger that the starter switch 21 is turned ON from the OFF-state. The preheating control routine is previously stored in a ROM of the ECU 19.

The ECU 19 judges, at first in S2401 in the preheating control routine, whether or not the starter switch 21 is turned ON from OFF.

The ECU 19, when judging in S2401 that the starter switch 21 is not turned ON from OFF, finishes executing this routine, While on the other hand, the ECU 19, when judging in S2401 that the starter switch 21 is turned ON from OFF, advances to S2402.

In S2402, the ECU 19 inhibits applying the drive electric power to the starter motor 100 and the fuel injection valve as well, thereby inhibiting the operations of the starter motor 100 and of the fuel injection valve. Namely, the ECU 19 inhibits the start-up of the internal combustion engine body 1 in S2402.

In S2403, the ECU 19 controls the flow path switch valve 16 to shut off the fourth heater hose 11d and to connect the fifth hose 11e and the first bypass 13a with each other, and operates the electrically-driven water pump 14, thereby supplying the head-sided cooling water passageway 2a and the block-sided cooling water passageway 2b with the heat accumulation hot water reserved in the heat accumulation container 15.

In S2404, the ECU 19 inputs an output signal value THW of the second water temperature sensor 18.

In S2405, the ECU 19 judges whether or not the output signal value THW, inputted in S2404, of the second water temperature sensor 18 is equal to or higher than a predetermined temperature.

The ECU 19, when judging in S2405 that the output signal value THW of the second water temperature sensor 18 is lower than the predetermined temperature, deems that the heat accumulation hot water reserved in the heat accumulation container 15 does not flow in spread through the whole of the head-sided cooling water passageway 2a and of the block-sided cooling water passageway 2b, and executes again the processes after S2404 onward.

While on the other hand, the ECU 19, when judging in S2405 that the output signal value THW of the second water temperature sensor 18 is equal to or higher than the predetermined temperature, deems that the heat accumulation hot water reserved in the heat accumulation container 15 flows in spread through the whole of the head-sided cooling water passageway 2a and of the block-sided cooling water passageway 2b, and goes forward to S2406.

In S2406, the ECU 19 stops the circulation of the cooling water by a halt of applying the drive electric power to the electrically-driven water pump 14.

In S2407, the ECU 19 performs the cranking of the internal combustion engine body 1 by applying the drive electric power to the starter motor 100.

In S2408, the ECU 19 increments a value in a storage area of a counter C that is preset in a RAM etc of the ECU 19. This counter C counts an elapse time since the start of the operation of the starter motor 100.

InS2409, the ECU 19 judges whether or not a counter value, updated in S2408, of the counter C is equal to or larger than a predetermined value.

The ECU 19, when judging in S2409 that the counter value of the counter C is less than the predetermined value, executes again the processes after the S2408 onward.

While on the other hand, the ECU 19, when judging in S2409 that the counter value of the counter C is equal to or larger than the predetermined value, advances to S2410, wherein the ECU 19 permits applying the drive electric power to the fuel injection valve and thus starts up the internal combustion engine body 1.

Subsequently, the ECU 19 resets the value in the storage area of the counter C to "0" in S2411, and thereafter finishes executing the present routine.

Thus, the ECU 19 executes the preheating control routine, thereby actualizing a heat carrier supply means, a heat carrier supply stopping mechanism, a cranking means and a fuel injection inhibiting means according to the present invention.

Accordingly, under the preheating control in the sixth embodiment, the circulation of the cooling water is stopped just when the heat accumulation hot water reserved in the heat accumulation container 15 flows in spread through the whole of the head-sided cooling water passageway 2a and of the block-sided cooling water passageway 2b. Hence, it neither happens that the heat accumulation hot water supplied to the head-sided cooling water passageway 2a and the block-sided cooling water passageway 2b flows out of the head-sided cooling water passageway 2a and of the block-sided cooling water passageway 2b nor happens that the low-temperature cooling water having once flowed out of the head-sided cooling water passageway 2a and of the block-sided cooling water passageway 2b flows again into the head-sided cooling water passageway 2a and of the block-sided cooling water passageway 2b. As a consequence, the heat transferred to the internal combustion engine body 1 from the heat accumulation hot water is not absorbed again by the cooling water.

Further, under the preheating control in the sixth embodiment, the cranking of the internal combustion engine body 1 is conducted in the state of inhibiting the fuel injection, and therefore the compression by only suction takes place in each of the cylinders of the internal combustion engine body 1, and the cylinder block 1b is heated by the heat produced when the suction air is compressed. As a result, the wall surfaces of the intake port and of the cylinders of the internal combustion engine body 1 are promptly preheated by a multiplier effect of the heat of the heat accumulation hot water circulating through the head-sided cooling water passageway 2a and of the block-sided cooling water passageway 2b and the compression of the suction air, with the result that a temperature of the suction air and a temperature of a compression end rise. Therefore, the fuel vaporization is speeded up, and a temperature of the air/fuel mixture increases. Then, it is possible to reduce a quantity of the fuel adhered to the wall surface, stabilize the combustion, enhance a start-up property and decrease a warm-up operation time.

Note that the discussion on the preheating control routine in the sixth embodiment has been made by giving the example of counting the elapse time since the start of the operation of the starter motor 100 and performing the cranking based on only the suction till the elapse time reaches the predetermined time. There may also be, however, counted a total sum of the number of rotations of the crank shaft from the start of the operation of the starter motor 100 and performed the cranking based on only suction till the total sum comes to a predetermined value.

Further, the internal combustion engine has been exemplified in the sixth embodiment as a body supplied with the heat according to the present invention. the heat-supplied body is not, however, limited to the internal combustion engine and may also be an electric motor, a battery, a transmission and so on.

What is claimed is:

1. An internal combustion engine including a heat accumulation system, comprising:
   heat carrier flow passageways, formed in a cylinder head and a cylinder block of said internal combustion engine, for flowing a heat carrier through;
   a heat accumulation system for reserving said heat carrier in a way that retains heat energy;
   a heat carrier pumping device for circulating said heat carrier in said heat accumulation system through said heat carrier flow passageways of at least said cylinder head of said internal combustion engine when or before starting up said internal combustion engine; and
   a heat carrier switching device, including a flow-path switch valve responsive to a controller and disposed between said heat carrier pumping device and said heat carrier flow passageways for stopping circulation of said heat carrier to said heat carrier flow passageways from said heat accumulation system by configuring a flow circuit in which said heat carrier circulates through a head-sided cooling water passageway and a block-sided cooling water passageway only when a predetermined condition is determined to be satisfied by the controller after said heat carrier pumping device has started circulating the heat carrier.

2. An internal combustion engine including a heat accumulation system according to clam 1, wherein said heat carrier pumping device has a heat carrier passageway for connecting said heat carrier flow passageway to said heat accumulation system, and a pump mechanism, operating independently of said internal combustion engine, for feeding said heat carrier by pressure existing in said heat carrier passageways, and
   said heat carrier in said heat accumulation system is supplied to said heat carrier flow passageways by operating said pump mechanism before starting up said internal combustion engine.

3. An internal combustion engine including a heat accumulation system according to clam 1, further comprising a fuel injection inhibiting device for inhibiting a fuel injection of said internal combustion engine during the supply of said heat carrier by said heat carrier pumping device to said heat carrier flow passageways from said heat accumulation system.

4. An internal combustion engine including a heat accumulation system according to claim 1, further comprising a cranking device for starting the cranking of said internal combustion engine after said heat carrier switching device has stopped the supply of said heat carrier to said heat carrier flow passageways from said heat accumulation system.

5. An internal combustion engine including a heat accumulation system according to claim 4, further comprising a fuel injection inhibiting device for inhibiting the fuel injection of said internal combustion engine during a predetermined period since said cranking device has started the cranking of said internal combustion engine.

6. An internal combustion engine including a heat accumulation system according to claim 1, wherein said heat carrier switching device stops said heat carrier pumping device from circulating said heat carrier on the condition that the temperature of said internal combustion engine reaches a predetermined temperature or higher.

7. An internal combustion engine including a heat accumulation system according to claim 1, wherein said heat carrier switching device stops said heat carrier pumping device from circulating said heat carrier on the condition that a predetermined time elapses since said heat carrier switching device has started circulating said heat carrier.

8. A heat carrier supply control system comprising:
   a heat-supplied body formed with a heat carrier flow passageway for flowing a heat carrier therethrough;
   a heat carrier pumping device for circulating said heat carrier to said heat carrier flow passageway of said heat-supplied body; and
   a heat carrier switching device including a flow-path switch valve responsive to a controller and disposed between said heat carrier pumping device and said heat carrier flow passageway for stopping a circulation of said heat carrier to said heat-supplied body by configuring a flow circuit in which said heat carrier circulates through a head-sided cooling water passageway and a block-sided cooling water passageway only when a predetermined condition is determined to be satisfied by the controller after said heat carrier pumping device has started circulating said heat carrier.

9. A heat carrier supply control system according to claim 8, further including a heat accumulation device disposed between said heat carrier pumping device and said flow-path switch valve, wherein said heat carrier flow passageway and said heat carrier pumping device communicate with each other through a heater core for said heat carrier.

10. A heat carrier supply control system according to claim 8, wherein said heat-supplied body is at least one selected from an internal combustion engine, a transmission, a heater core, an electric motor and a battery.

* * * * *